(12) United States Patent
Qi et al.

(10) Patent No.: US 8,117,178 B2
(45) Date of Patent: Feb. 14, 2012

(54) NATURAL LANGUAGE BASED SERVICE SELECTION SYSTEM AND METHOD, SERVICE QUERY SYSTEM AND METHOD

(75) Inventors: Hongwei Qi, Beijing (CN); Weisong Hu, Beijing (CN)

(73) Assignee: NEC (China) Co., Ltd, Beijing (CN)

( * ) Notice: Subject to any disclaimer, the term of this patent is extended or adjusted under 35 U.S.C. 154(b) by 674 days.

(21) Appl. No.: 12/239,422

(22) Filed: Sep. 26, 2008

(65) Prior Publication Data

US 2009/0089282 A1    Apr. 2, 2009

(30) Foreign Application Priority Data

Sep. 30, 2007    (CN) .......................... 2007 1 0180648

(51) Int. Cl.
*G06F 17/30*    (2006.01)
(52) U.S. Cl. ......... 707/706; 707/707; 707/708; 707/771
(58) Field of Classification Search .................. 707/706, 707/707, 708, 771
See application file for complete search history.

(56) References Cited

U.S. PATENT DOCUMENTS

| | | | | |
|---|---|---|---|---|
| 6,564,213 B1* | 5/2003 | Ortega et al. ........................ | 1/1 |
| 7,769,757 B2* | 8/2010 | Grefenstette et al. .......... | 707/736 |
| 7,802,194 B2* | 9/2010 | Kol et al. ...................... | 715/765 |
| 7,814,085 B1* | 10/2010 | Pfleger et al. .................. | 707/708 |
| 7,860,877 B2* | 12/2010 | Petropoulos et al. ......... | 707/759 |
| 7,873,519 B2* | 1/2011 | Bennett ............................ | 704/257 |
| 7,890,526 B1* | 2/2011 | Brewer et al. .................. | 707/767 |
| 7,958,110 B2* | 6/2011 | Hood et al. .................... | 707/706 |
| 8,010,523 B2* | 8/2011 | Djabarov ........................ | 707/721 |
| 2003/0069877 A1* | 4/2003 | Grefenstette et al. ............ | 707/2 |
| 2005/0283468 A1* | 12/2005 | Kamvar et al. ................... | 707/3 |
| 2006/0106769 A1* | 5/2006 | Gibbs ............................... | 707/3 |
| 2006/0173821 A1* | 8/2006 | Hennum et al. .................. | 707/3 |
| 2007/0050351 A1* | 3/2007 | Kasperski et al. ............... | 707/4 |
| 2007/0050352 A1* | 3/2007 | Kim ................................... | 707/4 |
| 2007/0100890 A1* | 5/2007 | Kim ........................... | 707/104.1 |
| 2007/0168335 A1* | 7/2007 | Moore et al. ..................... | 707/3 |
| 2008/0010259 A1* | 1/2008 | Feng et al. ........................ | 707/3 |
| 2008/0065617 A1* | 3/2008 | Burke et al. ...................... | 707/5 |
| 2008/0114743 A1* | 5/2008 | Venkataraman et al. ......... | 707/3 |
| 2008/0140634 A1* | 6/2008 | Williams .......................... | 707/3 |
| 2009/0049020 A1* | 2/2009 | Im .................................... | 707/3 |
| 2009/0094145 A1* | 4/2009 | Kim et al. ........................ | 705/34 |
| 2009/0119289 A1* | 5/2009 | Gibbs et al. ...................... | 707/5 |
| 2010/0153440 A1* | 6/2010 | Hubert .......................... | 707/769 |
| 2010/0287149 A1* | 11/2010 | Joshi ............................. | 707/706 |
| 2010/0325100 A1* | 12/2010 | Forstall et al. ............... | 707/706 |
| 2011/0087686 A1* | 4/2011 | Brewer et al. ................. | 707/766 |

FOREIGN PATENT DOCUMENTS

| | | |
|---|---|---|
| JP | 2002-351913 A | 12/2002 |
| JP | 2004-054781 A | 2/2004 |
| JP | 2004-288118 A | 10/2004 |

* cited by examiner

*Primary Examiner* — Thanh-Ha Dang
(74) *Attorney, Agent, or Firm* — Sughrue Mion, PLLC

(57) ABSTRACT

The present invention relates to a natural language based service selection system for complementing incomplete queries, which comprises a semantic analyzing device which analyzes an incomplete query from a user semantically, a service selecting device which complements the incomplete query based on the semantic-analyzed query so as to acquire the corresponding selected service, and a retrieving device which retrieves an answer according to the selected service. The present invention also relates to a natural language based service selection to method as well as a service query system and method thereof, and thus can process an incomplete query from a user and provide a selected service.

36 Claims, 26 Drawing Sheets

| Number | Requirement | Service type | Service parameter |
|---|---|---|---|
| 1 | how high is the temperature | weather | <place>:<date> |
| 2 | how to contact | telephone | <place> |

Fig. 2a

| User | Query question | Query time | Service type | Query parameter |
|---|---|---|---|---|
| Tom | Where is Beijing Hotel? | 2007-8-2 16:25 | Location | Place: Beijing Hotel |
| John | how high is the temperature in Beijing today? | 2007-7-21 8:30 | Weather | Place: Beijing<br>Date: today |

Fig. 3

| Number | Service type | Lost parameter | Default value |
|---|---|---|---|
| 1 | Traffic | Time | Now |
| 2 | Weather | Date | Today |

Fig. 4a

NATURAL LANGUAGE BASED SERVICE SELECTION SYSTEM AND METHOD, SERVICE QUERY SYSTEM AND METHOD

BACKGROUND OF THE INVENTION

1. Field of Invention

The present invention relates to the field of natural language processing, and in particular to a natural language based service selection system and method as well as a service query system and method, which can complement incomplete queries so as to obtain a selected service and provide the corresponding query answer.

2. Description of Prior Art

The existing service selection system based on natural language allows a user to query various services in natural language, and then the system selects any service corresponding to the user's query from these services and feeds the answer back to the user. Such conventional service selection system based on natural language, however, can process only a complete natural language query from the user. If the user enters an incomplete query, that is, the query lacks some essential parameters, the system has difficulty in effectively handling such query, especially in finding the lost part of the query.

There have been some natural language based service selection systems, which can analyze and retrieve a service database according to the query inputted by a user so as to select a service corresponding to the user query from various service.

Patent Application No. JP2002351913 proposes a method in which a web service having optimal waiting time can be selected from all types of web services according to the history of user access to these web services (which particularly contains user name, longest waiting time, service type, latest access time, etc.) so as to avoid excessive load on network and service.

Patent Application No. JP2004054781 discloses a method which can extracts key words for retrieval from a user query in natural language and then select from various services the service corresponding to the key words for retrieval.

Patent Application No. JP2004288118 provides a method which can, based on service register data supplied by a service provider, select not only a service corresponding to a user query but also other services relevant to the service from a plurality of services.

SUMMARY OF THE INVENTION

The present invention is made to address the above problems. The object of the present invention is to process effectively an incomplete query. In other word, even though a query entered by the user is not complete, the invention can process it accordingly to obtain a selected service and thus a query answer.

According to the first aspect of the present invention, a natural language based service selection system for complementing incomplete queries is provided, comprising a semantic analyzing device which analyzes an incomplete query from a user semantically, a service selecting device which complements the incomplete query based on the semantic-analyzed query so as to acquire the corresponding selected service, and a retrieving device which retrieves an answer according to the selected service.

According to the second aspect of the present invention, a natural language based service selection method for complementing incomplete queries is provided, comprising a semantic analyzing step of analyzing an incomplete query from a user semantically, a service selecting step of complementing the incomplete query based on the semantic-analyzed query so as to acquire the corresponding selected service, and a retrieving step of retrieving an answer according to the selected service.

According to the third aspect of the present invention, a query system is provided, comprising a query receiver which receives a user query, a semantic analyzing device which parses the user query and semantically analyzes the query, a service selecting device which complements the incomplete query based on the semantic-analyzed query so as to acquire the corresponding selected service, a retrieving device which retrieves an answer according to the selected service, and an answer sender which sends the answer to the user.

According to the fourth aspect of the present invention, a query method is provided, comprising a query receiving step of receiving a user query, a semantic analyzing step of parsing the user query and semantically analyzes the query, an service selecting step of complementing the incomplete query based on the semantic-analyzed query so as to acquire the corresponding selected service, a retrieving step of retrieving an answer according to the selected service, and an answer sending step of sending the answer to the user.

According to the fifth aspect of the present invention, a query system is provided, comprising a query receiver which receives a user query, a semantic analyzing device which parses the user query and semantically analyzes the query, a determining device which determines whether the user query is an complete user query, a first service selecting device which performs a process on the complete query so as to acquire a first selected service, a second service selecting device which complements the incomplete query so as to acquire a second selected service, a retrieving device which retrieves an answer according to the first selected service or the second selected service, and an answer sender which sends the answer to the user.

According to the sixth aspect of the present invention, a query method is provided, comprising a query receiving step of receiving a user query, a semantic analyzing step of parsing the user query and semantically analyzes the query, a determining step of determining whether the user query is an complete user query, a first service selecting step of performing a process on the complete query so as to acquire a first selected service, a second service selecting step of complementing the incomplete query so as to acquire a second selected service, a retrieving step of retrieving an answer according to the first selected service or the second selected service, and an answer sending step of sending the answer to the user.

BRIEF DESCRIPTION OF THE DRAWINGS

FIG. 2a is a block diagram showing an example of a service mapping rule base according to the present invention;

FIG. 3 is a block diagram showing an example of a user query history base according to the present invention;

FIG. 4a is a block diagram showing an example of a fact base according to the present invention;

DETAILED DESCRIPTION OF PREFERRED EMBODIMENTS

Hereafter, a description will be made to the preferred embodiments of the present invention with reference to the figures, throughout which like elements are denoted by like reference symbols or numbers. In the following description, the details of any known function or configuration will not be repeated, otherwise they may obscure the subject of the present invention.

Figure 1A:
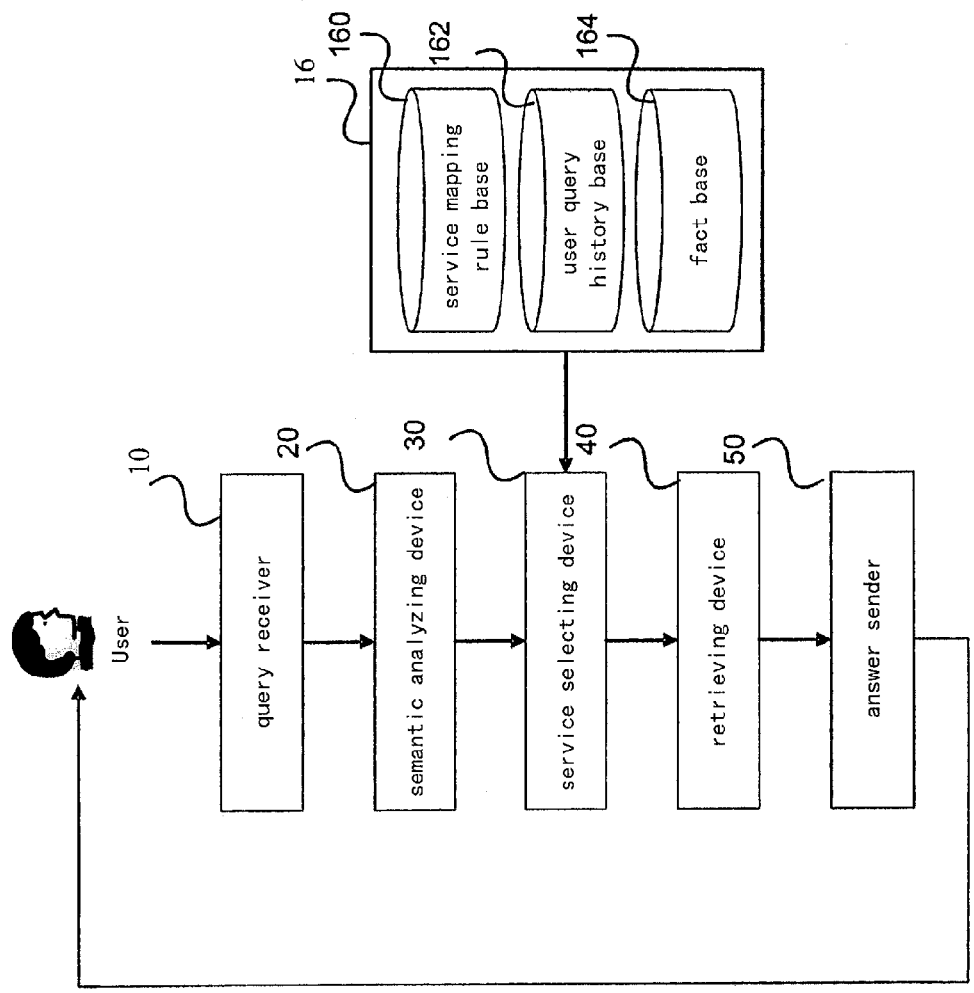
FIG. 1a is a schematic diagram showing a natural language based service selection system according to the present invention.

In general, the existing query device cannot process a query inputted by a user if the query is incomplete and thus cannot provide the user with his/her expected query answer. The service selection system according to the present invention, however, can complement an incomplete query from a user and thus retrieve an answer desired by the user. FIG. 1a shows a natural language based service selection system according to the present invention, which comprises a query receiver 10 for receiving a natural language query inputted by a user via a mobile terminal, such as a mobile phone, a semantic analyzing device 20 for analyzing the received natural language query to obtain a structured semantic analysis result, a service selecting device 30 for determining and complementing the lost content in the incomplete query based on the semantic analysis result so as to acquire a selected service, a retrieving device 40 for retrieving an answer according to the selected service, and an answer sender 50 for sending the retrieved answer to the user terminal. The service selection system further comprises a storage device 16, such as a hard disk, which stores a service mapping rule base 160, a user query history base 162 and a fact base 164.

Figure 1B:
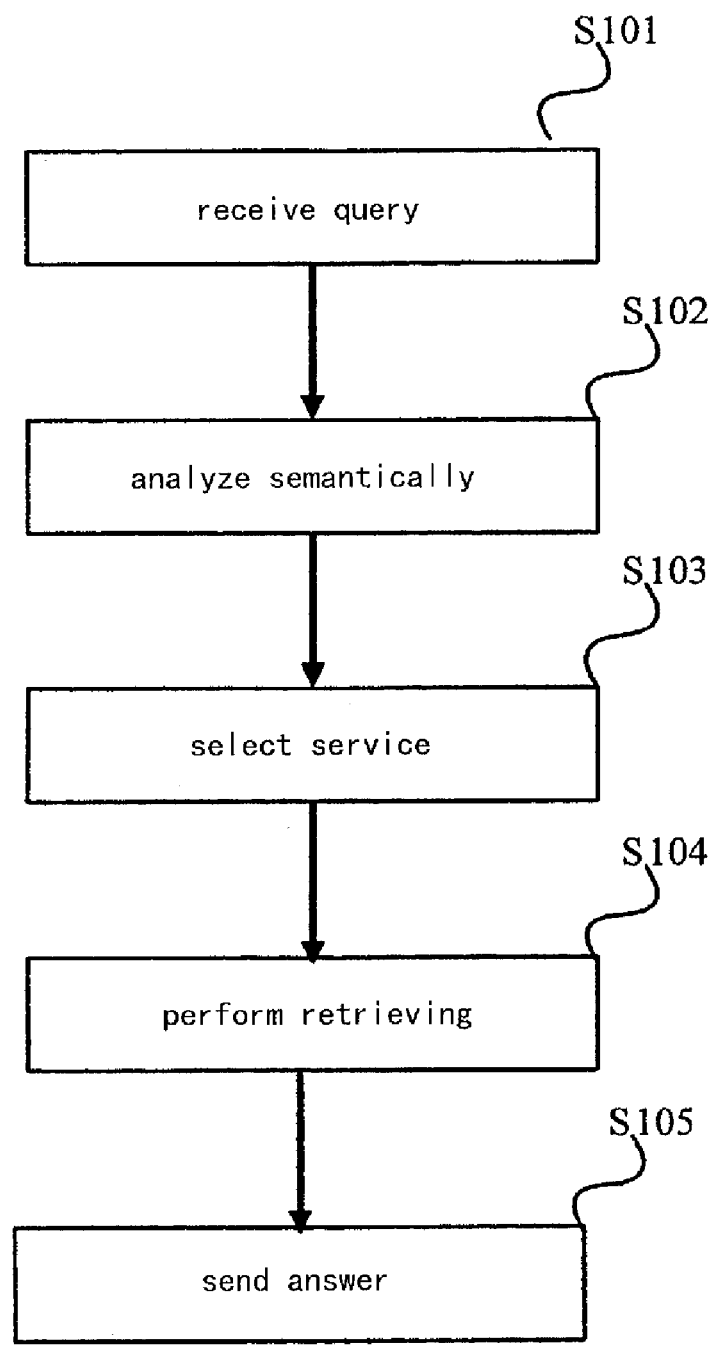
FIG. 1b is a flowchart showing a natural language based service selection method according to the present invention.
Figure 4B:
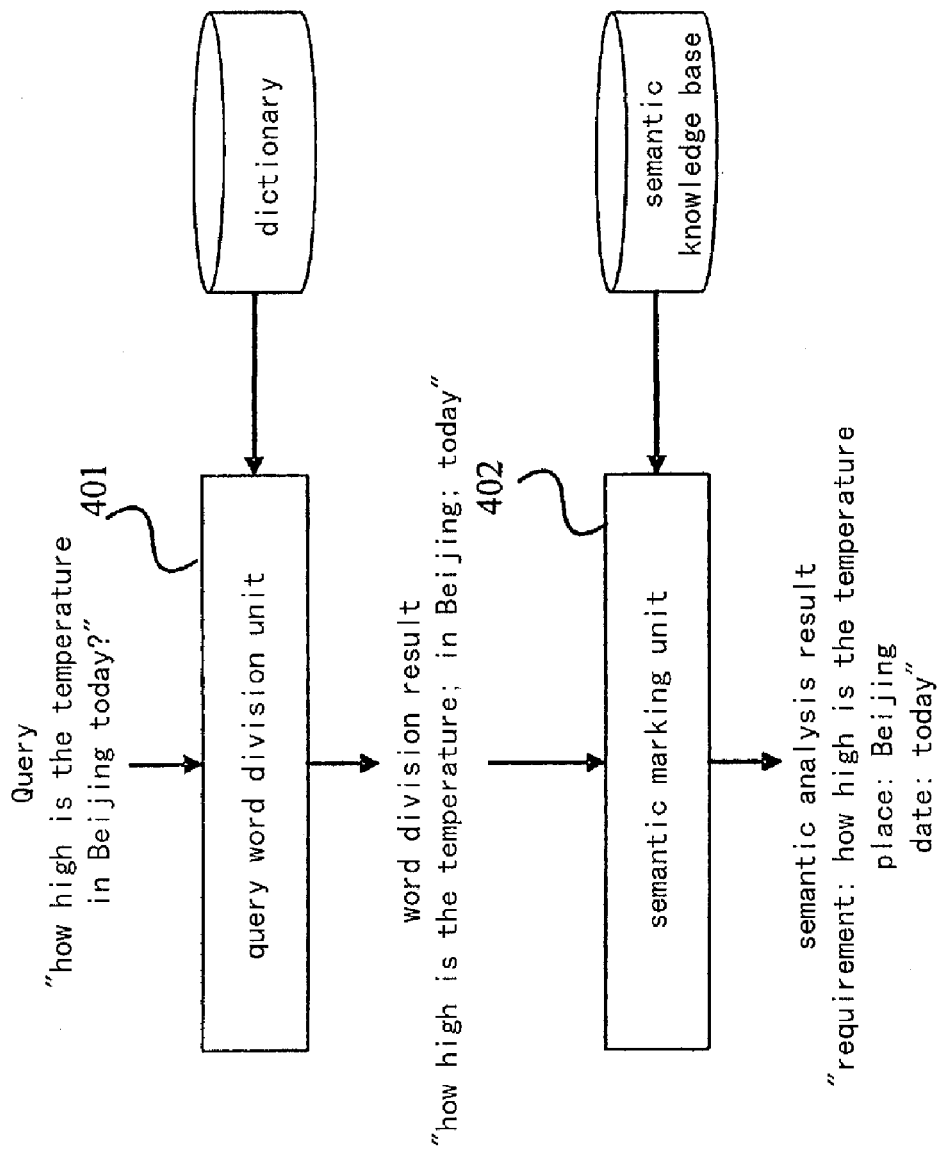
FIG. 4b is a schematic diagram showing a known semantic analyzing device.

FIG. 1b shows a flowchart of a natural language based service selection method. At S101, the query receiver 10 receives a natural language query sent from a user via a mobile terminal, such as a mobile phone, and transmits the query to the semantic analyzing device 20. The semantic analyzing device 20 analyzes the received natural language query at S102. FIG. 4b shows a block diagram of a known semantic analyzing device, which serves to understand the user's natural language query so as to obtain a structured semantic analysis result as well as includes a query word division unit 401 and a semantic marking unit 402. The query word division unit 401 performs word division on the natural language query with a word database, such as a dictionary, and then the semantic marking unit 402 performs semantic marking on the division result based on a semantic knowledge base so as to generate the semantic analysis result, which is usually formed of a requirement and a set of parameters and parameter values. Each parameter corresponds to its parameter value. Referring to FIG. 4b, for example, if the nature language query entered by the user is "How high is the temperature in Beijing today?", this natural language query is subjected to word division by the query word division unit 401 to generate a word division result "How high is the temperature; in Beijing; today". Then, the result undergoes semantic analysis by the semantic marking unit 402. Specifically, according to the semantic knowledge base, it can be learnt that "Beijing represents a place" and "today represents a date". As such, the semantic marking unit 402 marks "Beijing" in the natural language query as the parameter value of the first parameter "place", and "today" as the parameter value of the second parameter "date". It further extracts the interrogative "How high is the temperature" as the requirement. Eventually, the obtained result is "requirement: How high is the temperature, place: Beijing, date: today".

Figure 11A:
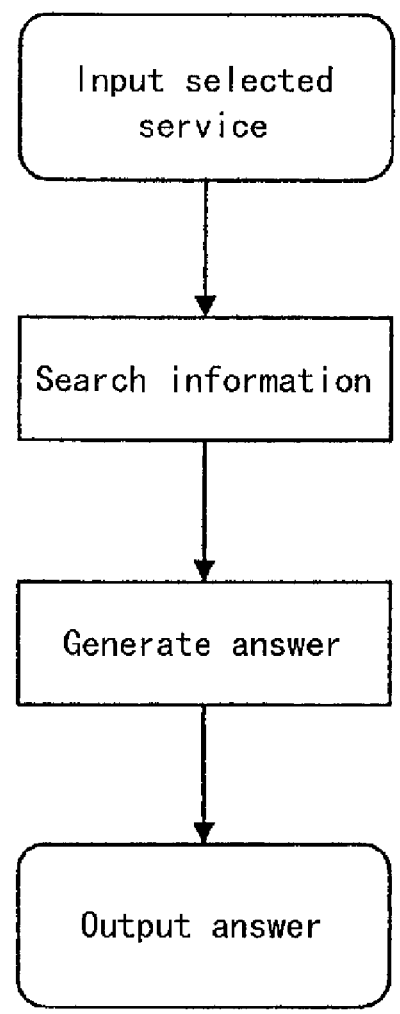
FIGS. 11a and 11b shows flowcharts of the first and second embodiments of a retrieval method, respectively.

At S103, the service selecting device 30 analyzes the semantically-analyzed query in terms of completeness by use of the service mapping rule base 160, the user query history base 162 or the fact base 164 and then complement any lost content to obtain a service which is selected from various services provided from the service mapping rule base according to the user query. The retrieving device 40 retrieves the corresponding answer based on the selected service at S104. The retrieving device may return only the answer corresponding to the user query, as shown in FIG. 11a, through a method comprising steps of:

(1) information search, that is, finding the service provider corresponding to the service type in the selected service and then sending the service parameters in the selected service to the service provider which will search and return a corresponding retrieval result; and (2) answer generation, that is, generating the final answer according to the retrieval result returned by the service provider. An integration is required for respective retrieval results if there are a number of service providers. The integration can be implemented in any relevant known method, such as ranking these results based on the credit standing of each service provider.

Referring to the above example of the user query "How high is the temperature in Beijing today?", based on the selected service "service type: weather; place: Beijing; date: today", the system can find service providers corresponding to the service type "weather", such as China Weather Bureau, Weather Query Website and the like, send the service parameters "place: Beijing; date: today" to the service providers and receive and integrate the retrieval results returned by them.

Figure 11B:
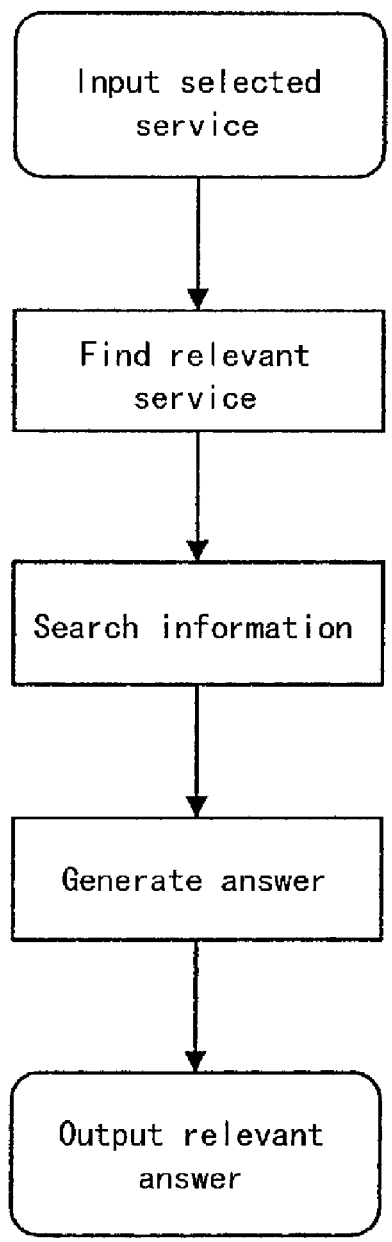

The retrieving device 40 can also return other relevant answers, as shown in FIG. 11b in which there is a step of finding relevant services, that is, finding other services relevant to the user query. For example, when a user queries how to get to a place, the system can provide information of relevant services, such as weather, traffic and the like in addition to providing a route. This can be realized in a prior art manner, for example, predefining a service relevancy table for recording relevancy between different service types and then finding a relevant service type on the basis of the service relevancy table.

The retrieved answer is sent to the user terminal by the answer sender 102 at S105.

In the present invention, the service selecting device 30 in the service selection system utilizes the service mapping rule base 160, the user query history base 162 or the fact base 164 to determine the lost content in the query and therefore complement the lost content so as to select the corresponding service. Accordingly, the following description is made with respect to the structures of the service mapping rule base 160, the user query history base 162 and the fact base 164 with respect to FIGS. 2a, 2b, 3 and 4. Then, a detailed explanation will be given to the inventive service selection system in connection to the service mapping rule base, the user query history base and the fact base.

The service mapping rule base 160 stores multiple sets of service mapping rules. When the match is established between the user's nature language query and a service mapping rule in the service mapping rule base 160, a service corresponding to the rule can be found. FIG. 2a shows an example of the service mapping rule base 160. As shown in FIG. 2a, one piece of service mapping rule is generally composed of number, requirement, service type and service parameters. The requirement represents what is the question from the user query, that is, what service is related to the answer expected by the user. The service type defines the service category to which the query question belongs. The service parameters describe service type and service invocation interface, and the service provider can conduct retrieval based on service parameters. Each piece of rule stored in the service mapping rule base 160 represents "when a user query conforms to a specified requirement, which service type the query corresponds to and what is the corresponding service parameter".

Take the first piece of mapping rule in FIG. 2a as an example, since the requirement in the user query is "how high is the temperature", the query corresponds to the service type "weather", and the service parameter are place and date.

Figure 2B:
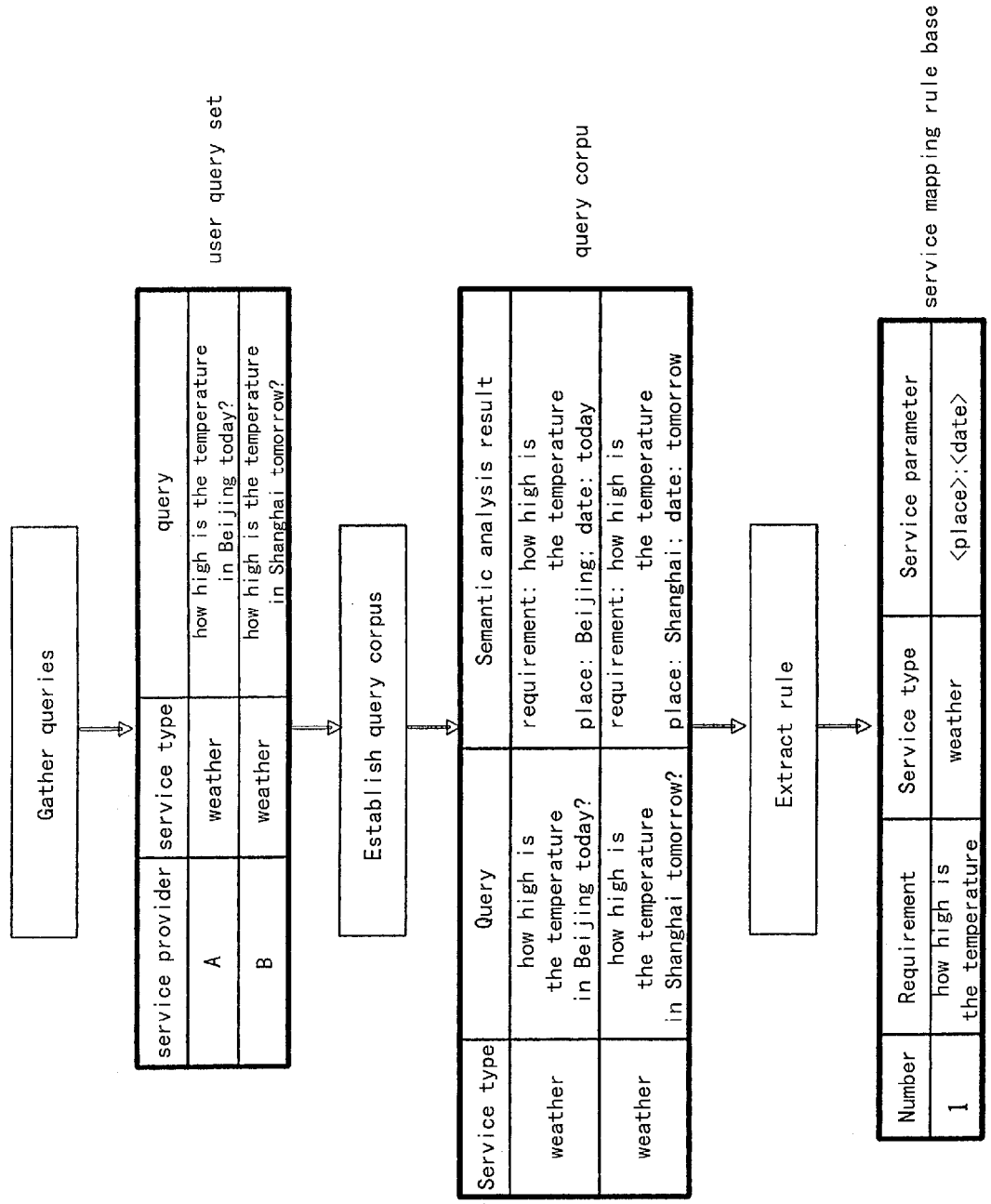
FIG. 2b is a flowchart showing a method for generating a service mapping rule base.

FIG. 2b shows an example of a method for generating the service mapping rule base. First, a set of actual user queries is gathered from respective service providers. Then, a query corpus is established from the gathered user queries. Here, any semantic analyzing method in the prior art can be utilized to analyze each user query and obtain a semantic analysis result for the purpose of query corpus establishment. Lastly, the similarity between the marking results of all the queries for each service type is analyzed in the query corpus, and certain service mapping rule is extract from the similarity and written into the service mapping rule base.

For example, those frequently-asked queries, such as "how high is the temperature in Beijing today?" or "how high is the temperature in Shanghai tomorrow?", are first gathered from weather service providers. Then a query corpus is established from semantic analysis results obtained through semantic analysis, and all queries related to the service type "weather" are analyzed to extract the common requirement "how high is the temperature" as well as the common parameters "place" and "date" so as to finally generate a service mapping rule for "weather". Although the above method generates the service mapping rule base automatically, the base can be manually generated by summarizing various service mapping rules by an operator. Alternatively, the service mapping rule base can be semi-automatically generated, that is, first generating service mapping rules automatically, and then correcting them manually.

FIG. 3 shows an example of the user query history base, which stores all user query records. Generally, one piece of user query record consists of user, query question, query time, service type and query parameter, and the query parameter can comprises a set of parameters each having a corresponding parameter value.

Take the first piece of user query record in FIG. 3 as an example, it represents that Tom made a query of "where is Beijing Hotel?" at 16:25 on Aug. 2, 2007, in which the service type is "location", the parameter "place" has a value of "Beijing Hotel".

The user query history is generated automatically. To be specific, every time processing on one user query is completed, the system stores, as one query record, the user, query question, query time and selected service.

FIG. 4a shows an example of the fact base, which describes customary or default knowledge. As shown in FIG. 4a, each fact is usually composed of number, service type, lost parameter and default value, and represents "when a user queries some service, what is the default value of a parameter if it is lost". Take the first fact as an example, which means "when a user queries traffic service, the time is considered as now (i.e., the current moment) by default if the user does not specify any time." The second fact represents "when a user queries weather service, the date is considered as today (i.e., this day) by default if the user does not specify any date." The fact base is created primarily by summarizing characteristics of respective services manually.

Figure 5A:
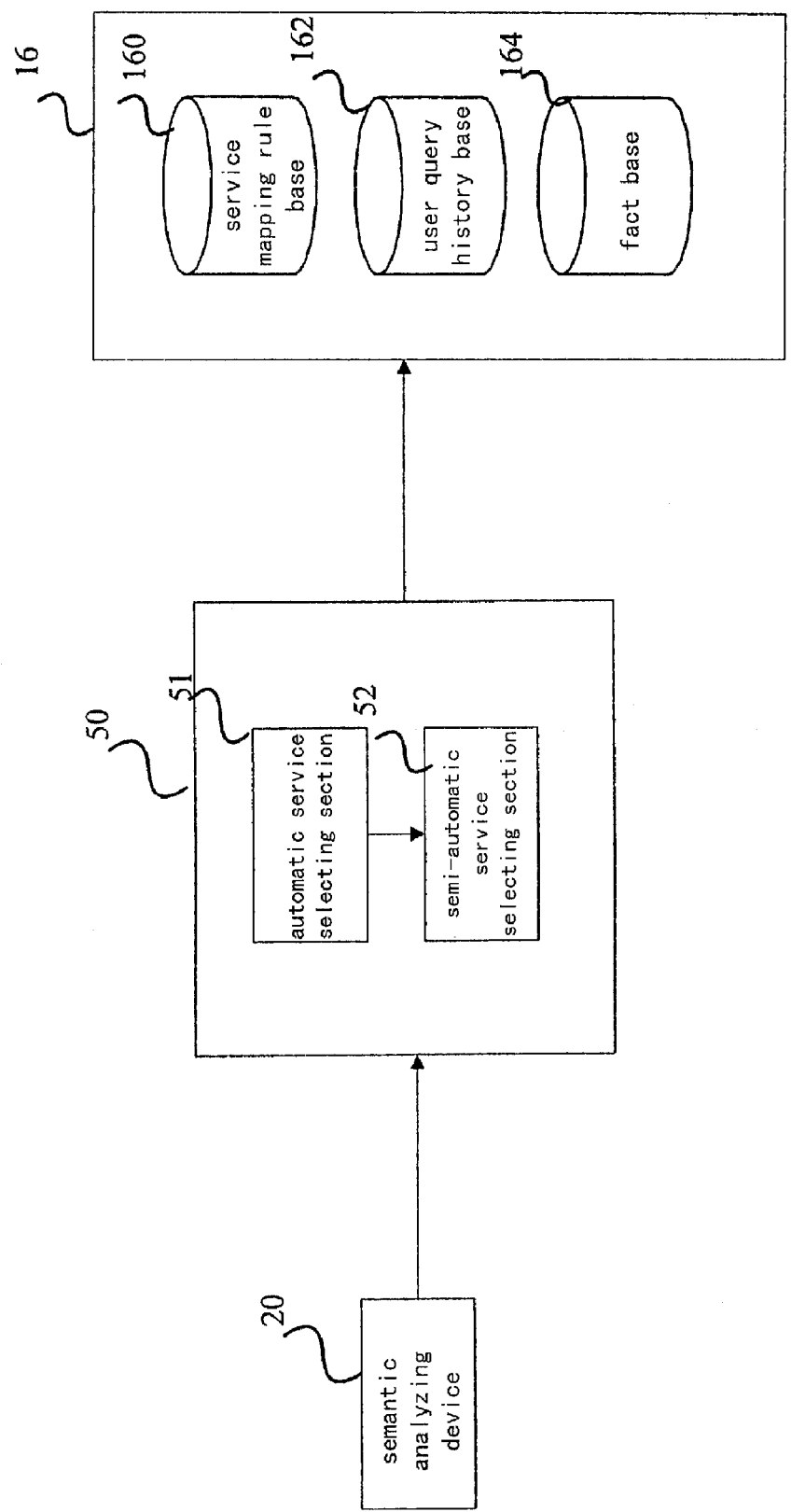
FIG. 5a is a schematic diagram showing a service selecting device according to the present invention.

FIG. 5a shows a schematic block diagram of the service selecting device according to the present invention. Generally speaking, a natural language query inputted by a user may be incomplete and may lack some necessary parameter values. For example, the user wants to make queries of "how high is the temperature in Beijing today?" and "how can I get to Beijing Airport from Zhongguancun?", while he actually inputs the queries of "how high is the temperature in Beijing?" and "how can I get to Beijing Airport?", which lack the parameter values "today" and "from Zhongguancun", respectively. With the existing natural language based service selection system, such incomplete queries cannot be processed and thus the user cannot obtain any answer related to his or her desired service. On the other hand, the service selecting device in the present invention can obtain a selected service by complementing such incomplete queries automatically or semi-automatically. Therefore, a complete query can be generated and the corresponding query answer can be provided to the user with the application of the service selecting device in the present invention, even though the user inputs an incomplete query.

Now turning to FIG. 5a, the service selecting device includes an input section (not shown) for receiving the semantically-analyzed user query, an automatic service selecting section 51 for complementing automatically an incomplete query based on the user's natural language query utilizing at least one of the service mapping rule base 160, the user query history base 162 or the fact base 164 so as to acquire a selected service, a semi-automatic service selecting section 52 for complementing an incomplete query through interaction with the user so as to acquire a selected service when the automatic service selecting section 51 does not obtain the selected service, or for complementing an incomplete query in the case that the user considers the result from the automatic service selecting section 51 not to comply with his or her query, and an output section (not shown) for outputting the selected service.

Figure 5B:
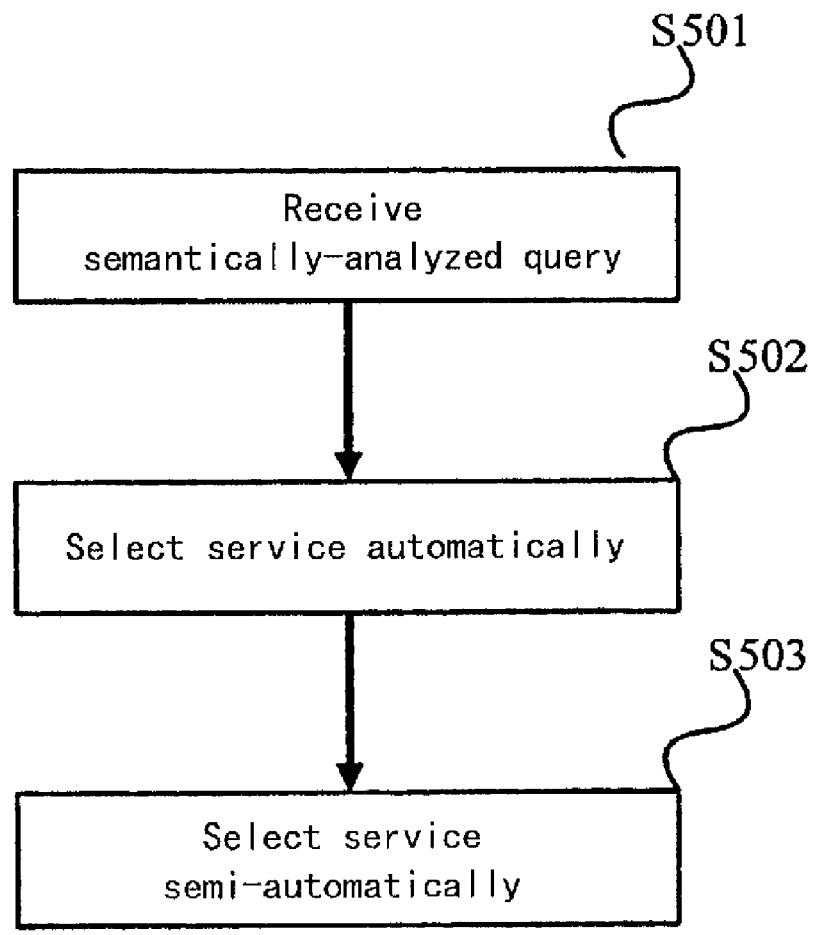
FIG. 5b is a schematic diagram showing a service selecting method according to the present invention.
Figure 6A:
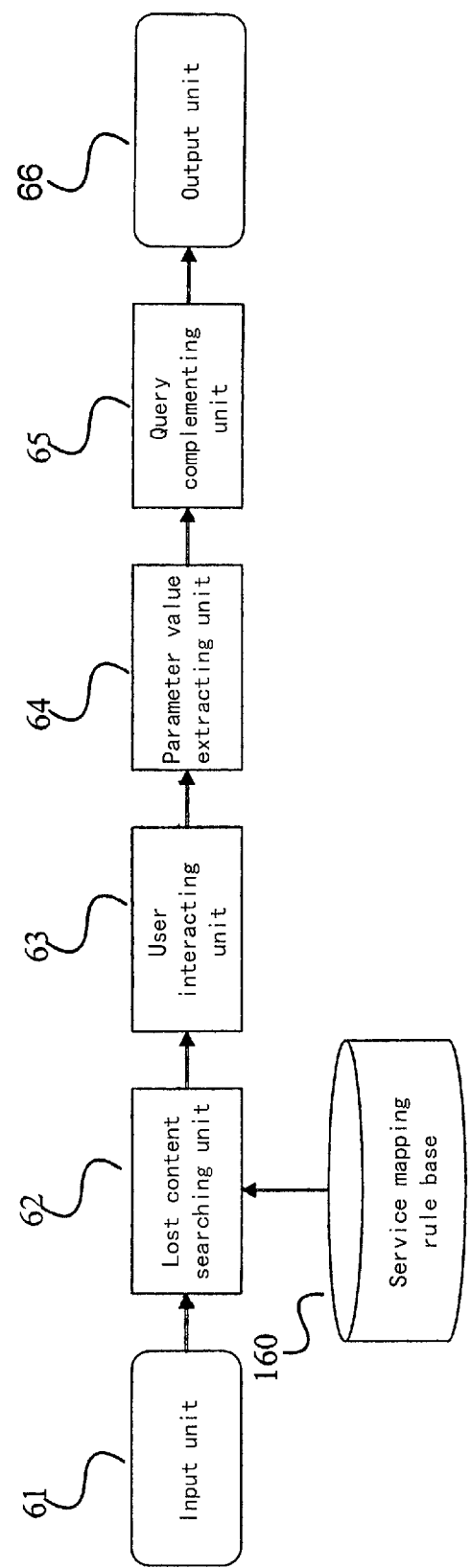
FIG. 6a is a block diagram showing a semi-automatic service selecting section according to the present invention.

FIG. 5b shows a flowchart of the service selecting method according to the present invention. At S501, the service selecting device receives the semantically-analyzed query. At S502, the automatic service selecting section 51 complements automatically the incomplete query based on the user's natural language query by utilizing at least one of the service mapping rule base 160, the user query history base 162 or the fact base 164 so as to acquire a selected service. When the automatic service selecting section 51 does not obtain the selected service or the user considers the result from the automatic service selecting section 51 does not comply with his or her query, the semi-automatic service selecting section 52 at S503 complements the incomplete query through interaction with the user so as to acquire the selected service. FIG. 6a shows a detailed block diagram of the semi-automatic service selecting section 52 according to the present invention. The semi-automatic service selecting section 52 comprises an input unit 61 for receiving a semantic analysis result obtained from analysis of a natural language query, a lost content searching unit 62 for matching the semantic analysis result with the service mapping rule in the service mapping rule base, finding a matched service mapping rule and extracting from it the service type and the service parameter lost in the query, a user interacting unit 63 for interacting with the user and acquiring the feedback information from the user, a parameter value extracting unit 64 for extracting the lost parameter valued from the feedback information of the user, a query complementing unit 65 for adding the service type, the lost service parameter and the lost parameter value into the semantic analysis result to complement the incomplete query so as to generate the selected service, and an output unit 66 for outputting the selected service after the above complementation.

Figure 6B:
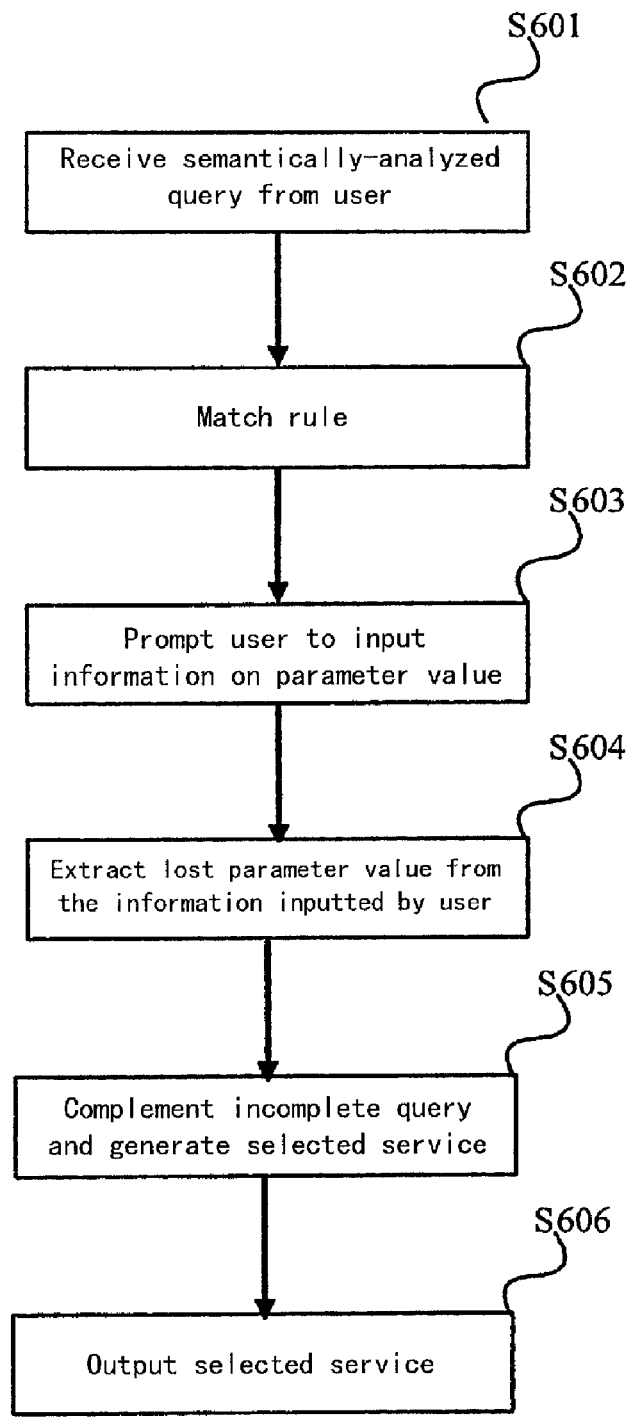
FIG. 6b is a flowchart showing a semi-automatic service selecting method.

FIG. 6b shows a flowchart of the semi-automatic service selecting method. At S601, the input unit 61 receives a semantically-analyzed query in natural language from the user terminal. The lost content searching unit 62 at S602 matches the semantic analysis result with the service mapping rule in the service mapping rule base, finds a matched service mapping rule and determines the lost service parameter. Then, it extracts from the matched service mapping rule the service type to which the query belongs and the service parameter lost in the query. Here, the matching scheme used by the lost content searching unit includes: (1) the requirement of the service mapping rule is identical to the requirement of the semantic analysis result; and (2) the service parameter of the service mapping rule contains the parameter of semantic analysis result. At S603, prompt information is generated to prompt the user to input the lost parameter value based on the lost parameter found in S602 and sent to the user, and the feedback information is in turn received from the user with respect to the prompt information. Since the feedback information of the user may contain some words other than the lost parameter value, the latter needs to be extracted from the feedback information at S604 after the reception of the user feedback. Here, the same semantic marking method as used in the above semantic analysis can be utilized to semantically mark the feedback information of the user and find words corresponding to the lost parameter as the lost parameter value. At S605, the query complementing unit 65 fills the service type, the lost service parameter and the lost parameter value into the semantic analysis result to complement the incomplete query and generate the selected service. Lastly, the output unit 66 outputs the selected service at S606. Automatic service selection can be performed in addition to the above semi-automatic service selection through interaction with the user.

Figure 6C:
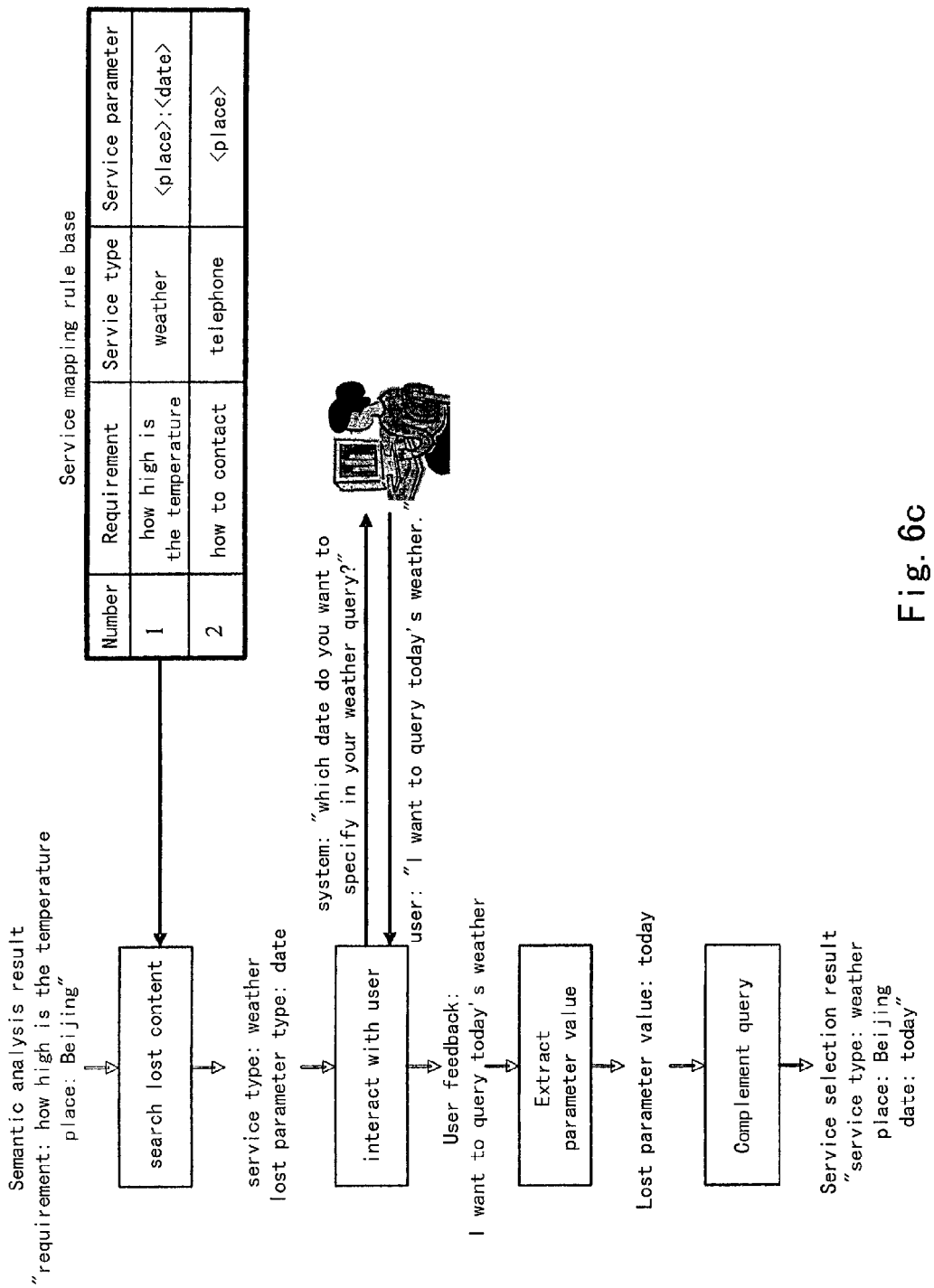
FIG. 6c shows an example of semi-automatic service selection.

FIG. 6c shows an example of automatic service selection, in which the user query is "how high is the temperature in Beijing?", and the semantic analysis result is "requirement: how high is the temperature; place: Beijing".

First step of searching lost content: the first rule in the service mapping rule base has the same requirement "how high is the temperature" as that of the semantic analysis result, and the service parameters "<place>; <date>" contain the parameter "place" of the semantic analysis result, the first rule is therefore taken as a matched rule, with the service type "weather" being extracted and "date" being the parameter lost in the query;

Second step of interacting with the user: generating prompt information "which date do you want to specify in your weather query?" and sending it to the user, and then receiving the user feedback "I want to query today's weather";

Third step of extracting the parameter value: taking "today" in the user feedback as the lost parameter value since this word belongs to the lost parameter "date";

Final step of complementing the query: adding the service type "weather", the lost parameter "date" and the lost parameter value "today" into the semantic analysis result to obtain a selected service "service type: weather; place: Beijing; date: today".

Figure 7A:
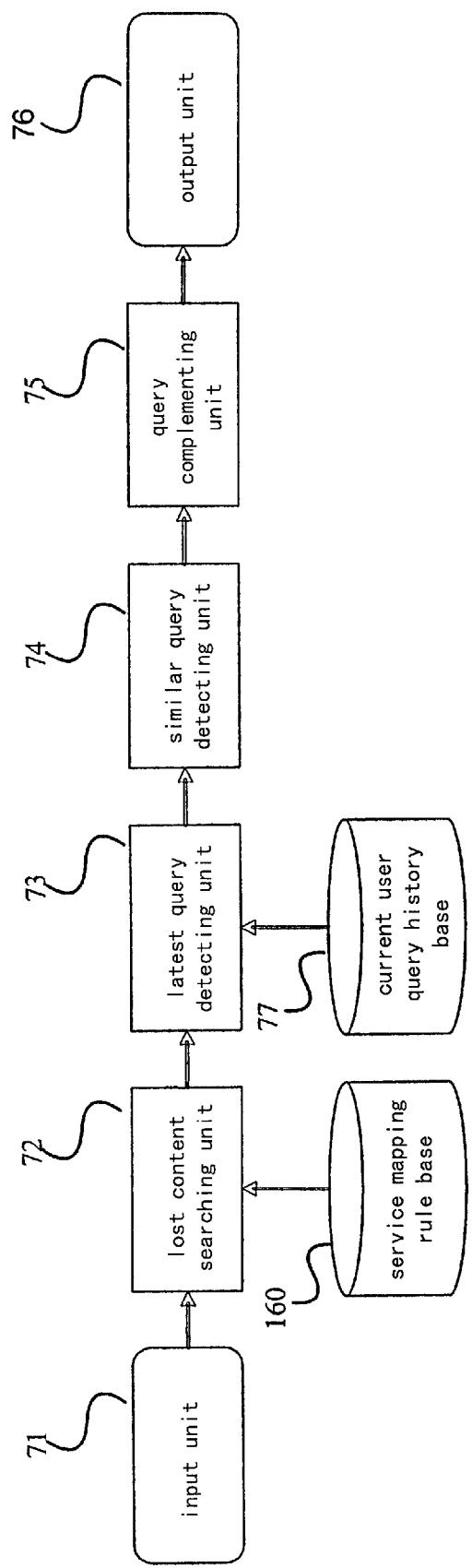
FIG. 7a is a block diagram showing a automatic service selecting section according to the first embodiment of the present invention.

FIG. 7a shows the first embodiment of the automatic service selecting section 61 according to the present invention, which complements an incomplete natural language query from a user based on a current user query history base. The automatic service selecting section 61 includes an input unit 71 for receiving the inputted semantic analysis result, a current user query history base 77 storing all records of queries by a user who is exactly the user of the current query, a lost content searching unit 72 for matching the semantic analysis result with the service mapping rule in the service mapping rule base, finding a matched service mapping rule, determines the lost service parameter, and extracting from the matched service mapping rule the service type to which the query belongs and the service parameter lost in the query, a latest query detecting unit 73 for detecting the history of the latest user query, i.e., the last query made by the user, and extracting the corresponding lost parameter value if the parameter lost in the current query is contained in the latest user query, a similar query detecting unit 74 for searching the history query that contains the lost parameter in the current query as a similar query from the current user query history base 77 when there is no parameter value extracted by the latest query detecting unit 73, and extracting the parameter value corresponding to the lost parameter in current query from the similar query if it contains the parameter lost in the current query, a query complementing unit 75 for adding the service type, the lost parameter and the parameter value into the semantic analysis query so as to obtain the selected service, and an output unit 76 for outputting the selected service.

Figure 7B:
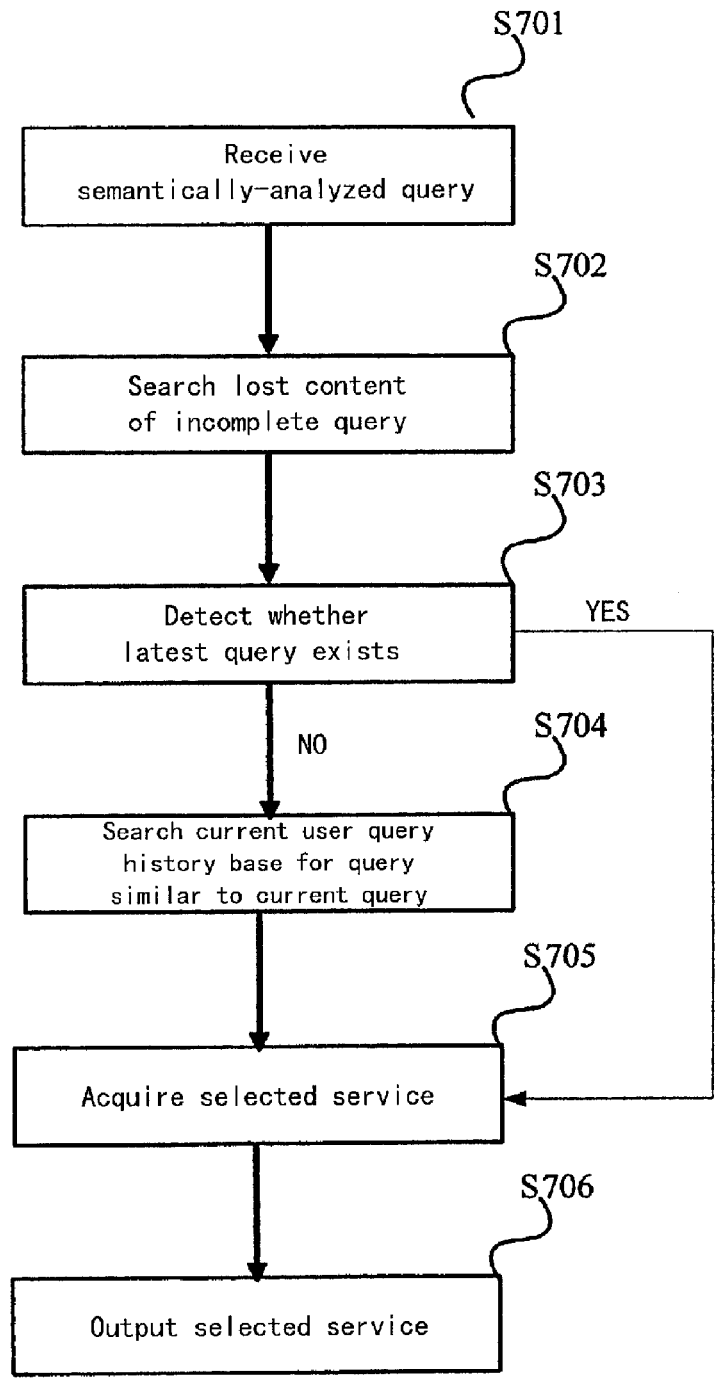
FIG. 7b is a flowchart showing a automatic service selecting method according to the first embodiment of the present invention.

FIG. 7b shows a flowchart of the first embodiment of the automatic service selecting method. At S701, the input unit 71 receives a semantically-analyzed query in natural language from the user. The lost content searching unit 72 at S702 matches the semantic analysis result with the service mapping rule in the service mapping rule base 160, finds a matched service mapping rule and determines the lost service parameter. Then, it extracts from the matched service mapping rule the service type to which the query belongs and the service parameter lost in the query. Here, the matching scheme used by the lost content searching unit 72 is the same as that used in the method shown in FIG. 6b.

At S703, the latest query detecting unit 73 searches the last query made by the user. Detecting the latest query, i.e., the last query made by the user, at first can accelerate the query process, since the user may omit some words while making several queries successively. The detailed method is: finding the latest query made by the user in the current user query history base 77, with a query interval being set to be smaller than a particular threshold; checking whether the latest query contains the parameter lost in the current query; if the answer is Yes, extracting the corresponding parameter value as the lost parameter value and then performing the step S705; otherwise, performing the step S704.

At S704, the similar query detecting unit 74 searches the current user query history base for a query similar to the current query, and extracts the parameter value corresponding to the lost parameter in current query from the similar query if it contains the parameter lost in the current query. The determination of the similar query is made such that a query is considered as the similar query if (1) the service type obtained at the lost content searching step is identical to that of the history query in the current user query history base; and/or (2) the query parameter of the history query contains the query parameter of the semantically-analyzed query (preferably, both the queries have the same parameter value).

At S705, the service type, the lost parameter and the parameter value are added into the semantic analysis query to obtain the selected service. Finally, the selected service is outputted at S706.

Figure 7C:
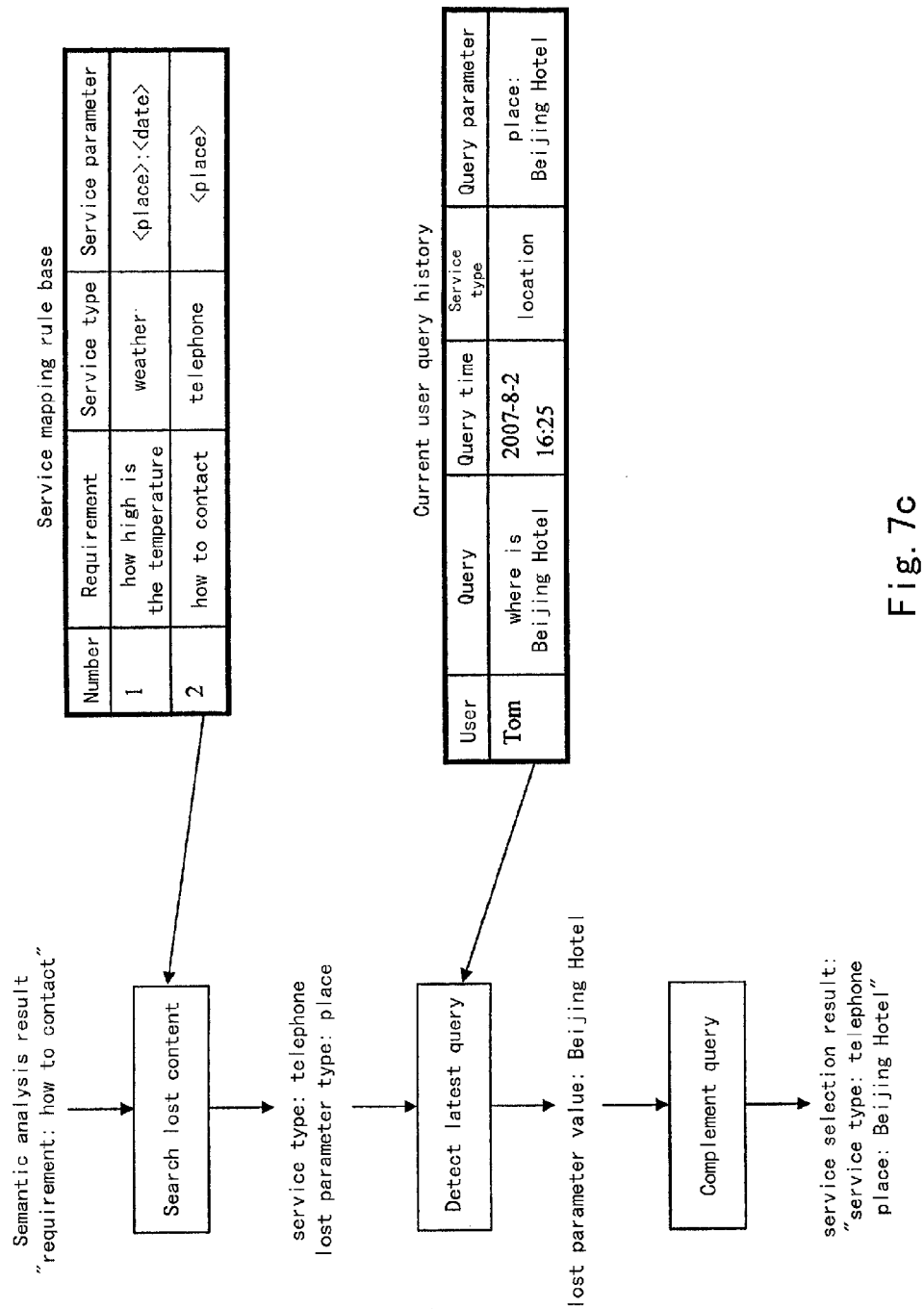
FIG. 7c shows an example of service selection.

FIG. 7c shows an example of the implementation of service selection, in which the user Tom makes a query of "how to contact?", and the semantic analysis result is "requirement: how to contact".

First step of searching lost content: the second rule in the service mapping rule base has the same requirement "how to contact" as that of the semantic analysis result, and there is no parameter in the semantic analysis result, the second rule is therefore taken as a matched rule, with the service type "telephone" being extracted and the service parameter "place" being the parameter lost in the query;

Second step of detecting the latest query: since the last query made by Tom is "where is Beijing Hotel?", and the query parameter is "place: Beijing Hotel" which contains the lost parameter "place", the corresponding parameter value "Beijing Hotel" is extracted;

No similar query is detected when the above latest query detection is successful;

Final step of complementing the query: adding the service type "telephone", the lost parameter "place" and the lost parameter value "Beijing Hotel" into the semantic analysis result to obtain a selected service "service type: telephone; place: Beijing Hotel".

Figure 8A:
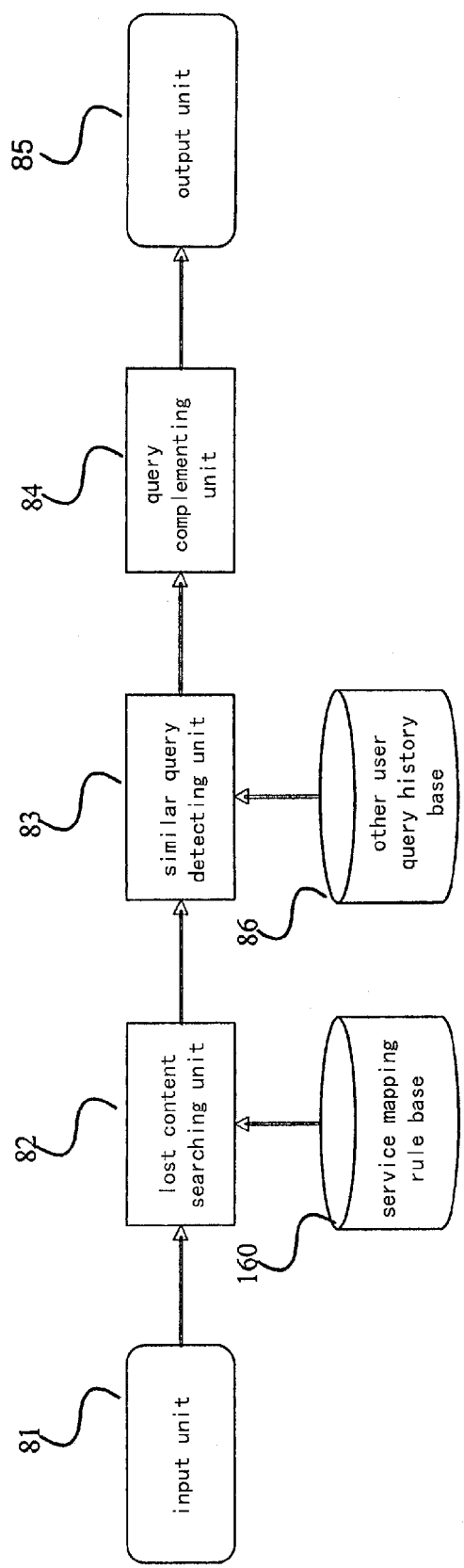
FIG. 8a is a block diagram showing a service selecting section according to the second embodiment of the present invention.

FIG. 8a shows the second embodiment of the automatic service selection section according to the present invention.

This automatic service selection section of the second embodiment complements a natural language query from a user based on other user query history base. Such service selection section comprises an input unit 81 for receiving the inputted semantic analysis result, an other user query history base 86 storing all records of queries by other users, a lost content searching unit 82 for matching the semantic analysis result with the service mapping rule in the service mapping rule base, finding a matched service mapping rule, determines the lost service parameter, and extracting from the matched service mapping rule the service type to which the query belongs and the service parameter lost in the query, a similar query detecting unit 83 for searching a query similar to the current query from the other user query history base 86 and extracting the parameter value from the similar query as the parameter value lost in the current query, a query complementing unit 84 for adding the service type, the lost parameter and the parameter value into the semantic analysis query so as to obtain the selected service, and an output unit 85 for outputting the selected service.

Figure 8B:
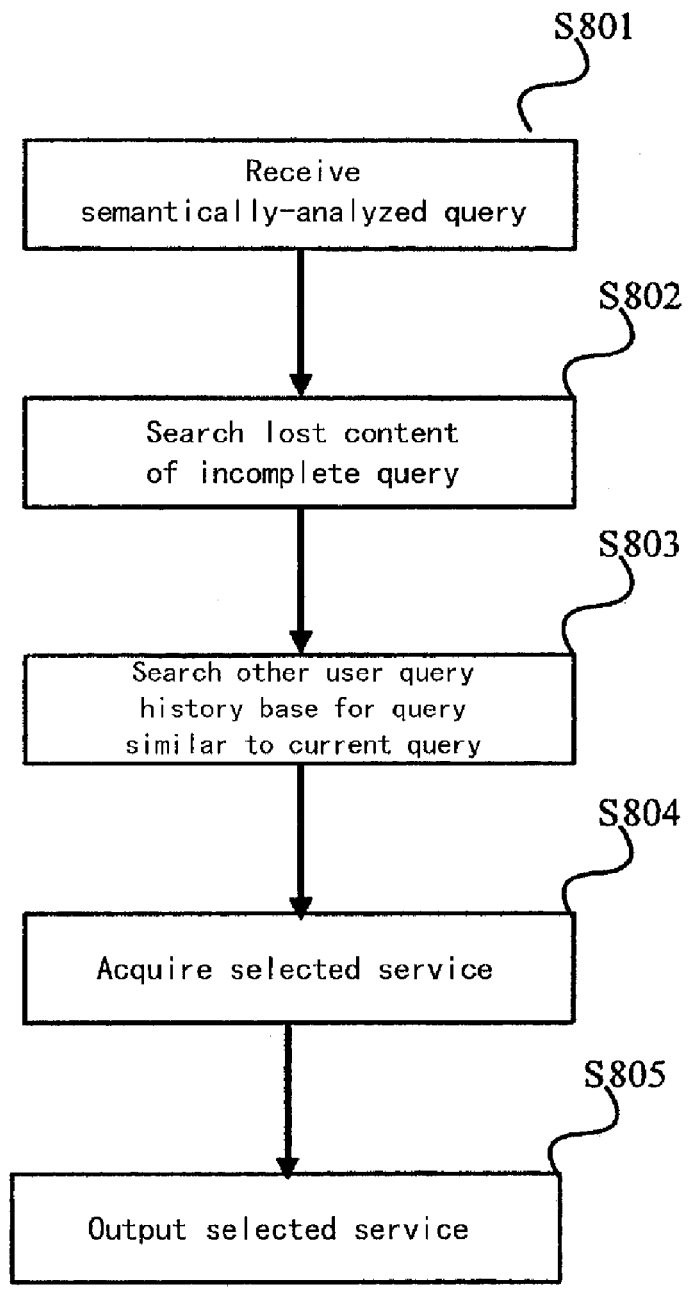
FIG. 8b is a flowchart showing a service selecting method according to the second embodiment of the present invention.

FIG. 8b shows a flowchart of the second embodiment of the automatic service selecting method.

At S801, the input unit 81 receives a semantically-analyzed query in natural language from the user. The lost content searching unit 82 at S802 matches the semantic analysis result with the service mapping rule in the service mapping rule base 160, finds a matched service mapping rule and determines the lost service parameter. Then, it extracts from the matched service mapping rule the service type to which the query belongs and the service parameter lost in the query. Here, the matching scheme used by the lost content searching unit 82 is the same as that used in the method shown in FIG. 6b.

At S803, the similar query detecting unit 83 searches the other user query history base for a query similar to the current query, and extracts the parameter value corresponding to the lost parameter in current query from the similar query if it contains the parameter lost in the current query. The determination of the similar query is made such that a query is considered as the similar query if (1) the service type obtained at the lost content searching step is identical to that of the history query in the other user query history base; and/or (2) the query parameter of the history query contains the query parameter of the semantically-analyzed query (preferably, both the queries have the same parameter value).

At S804, the service type, the lost parameter and the parameter value are added into the semantic analysis query to obtain the selected service. Finally, the selected service is outputted at S805.

Figure 8C:
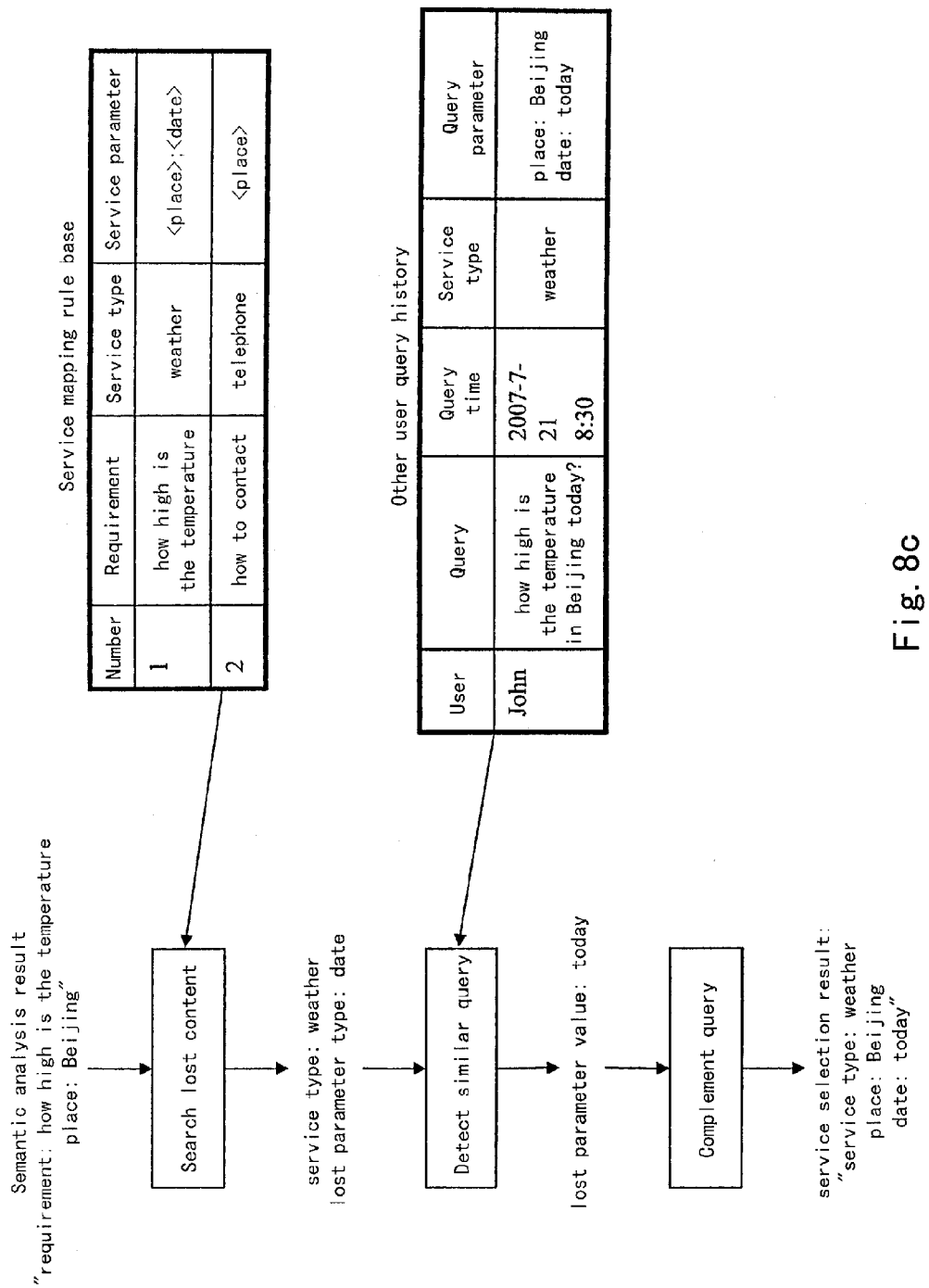
FIG. 8c shows another example of service selection.

FIG. 8c shows an example of the implementation of service selection, in which the user makes a query of "how high is the temperature in Beijing?", and the semantic analysis result is "requirement: how high is the temperature; place: Beijing".

First step of searching lost content: the first rule in the service mapping rule base has the same requirement "how high is the temperature" as that of the semantic analysis result, and the service parameters "<place>; <date>" contain the parameter "place" of the semantic analysis result, the first rule is therefore taken as a matched rule, with the service type "weather" being extracted and "date" being the parameter lost in the query;

Second step of detecting the similar query: there exists a query made by another user John, "how high is the temperature in Beijing today?", in which the service type is "weather", the query parameter "place: Beijing; date: today" contains the parameter "place" in the semantic analysis result, and both of the parameter values are "Beijing", this query is thus regarded as the similar query; since the similar query contains the lost parameter "date", the corresponding parameter value "today" is extracted;

Final step of complementing the query: adding the service type "weather", the lost parameter "date" and the lost parameter value "today" into the semantic analysis result to obtain a selected service "service type: weather; place: Beijing; date: today".

Figure 9A:
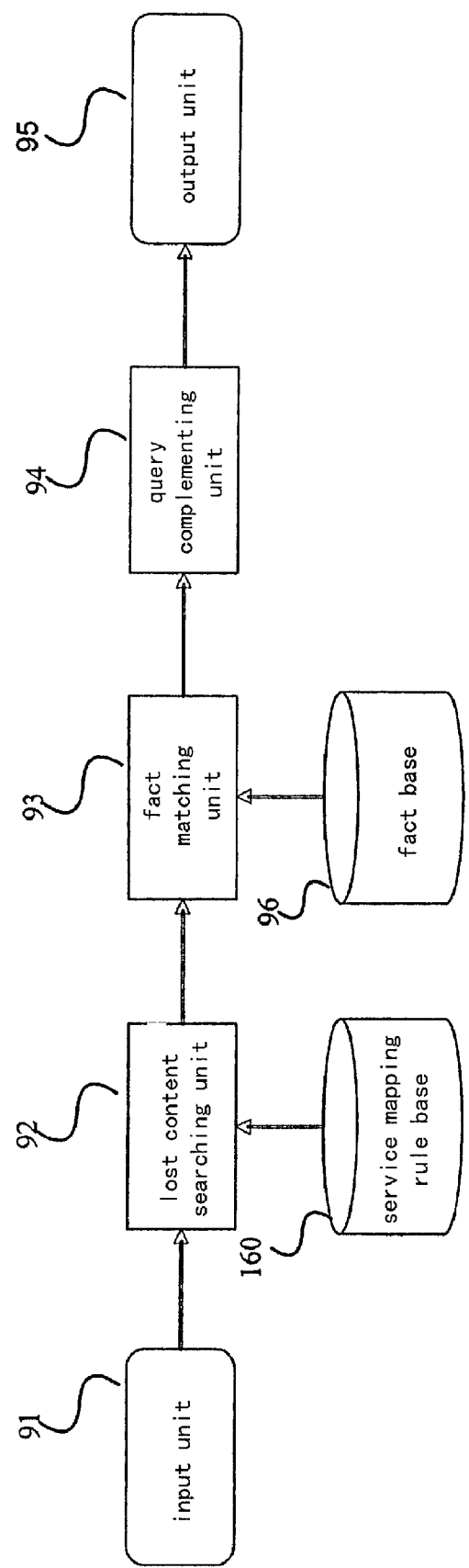
FIG. 9a is a block diagram showing a service selecting section according to the third embodiment of the present invention.

FIG. 9a is a schematic diagram showing the third embodiment of the automatic service selection section according to the present invention.

This automatic service selection section of the third embodiment complements a natural language query from a user based on a fact base.

Such service selection section comprises an input unit 91 for receiving the inputted semantic analysis result, a lost content searching unit 92 for matching the semantic analysis result with the service mapping rule in the service mapping rule base, finding a matched service mapping rule, determines the lost service parameter based on the matched service mapping rule, and extracting from the matched service mapping rule the service type to which the query belongs and the service parameter lost in the query, a fact matching unit 93 for matching the semantic analysis result with each fact in the fact base 96, finding a matched fact and extracting the default value in the matched fact as the parameter value lost in the current query, a query complementing unit 94 for adding the service type, the lost parameter and the parameter value of the lost parameter into the semantic analysis query so as to obtain the selected service, and an output unit 95 for outputting the selected service.

Figure 9B:
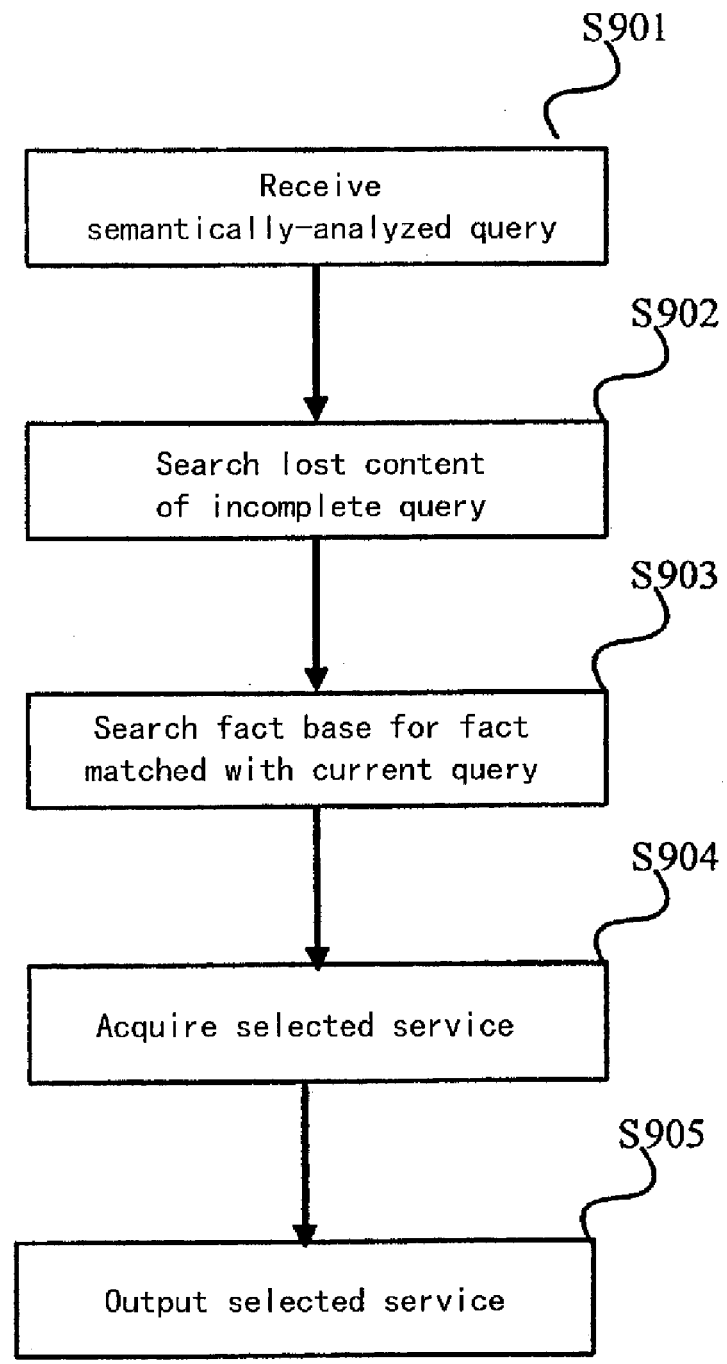
FIG. 9b is a flowchart showing a service selecting method according to the third embodiment of the present invention.

FIG. 9b shows a flowchart of the third embodiment of the automatic service selecting method according to this invention.

At S901, the input unit 91 receives a semantically-analyzed query in natural language from the user. The lost content searching unit 92 at S902 matches the semantic analysis result with the service mapping rule in the service mapping rule base 160, finds a matched service mapping rule and determines the lost service parameter. Then, it extracts from the matched service mapping rule the service type to which the query belongs and the service parameter lost in the query. Here, the matching scheme used by the lost content searching unit 92 is the same as that used in the method shown in FIG. 6b.

At S903, the fact matching unit 93 finds a matched fact by matching the semantic analysis result with each fact in the fact base 96 and extracting the default value in the matched fact as the parameter value lost in the current query. The determination of the matched fact is made such that a fact is considered as the matched query if (1) the service type obtained at the lost content searching step is identical to that of a fact in the fact base; and/or (2) the lost parameter in the fact is identical to that obtained at the lost content searching step.

At S904, the service type, the lost parameter and the parameter value of the lost parameter are added into the semantic analysis result to obtain the selected service. Finally, the selected service is outputted at S905.

Figure 9C:
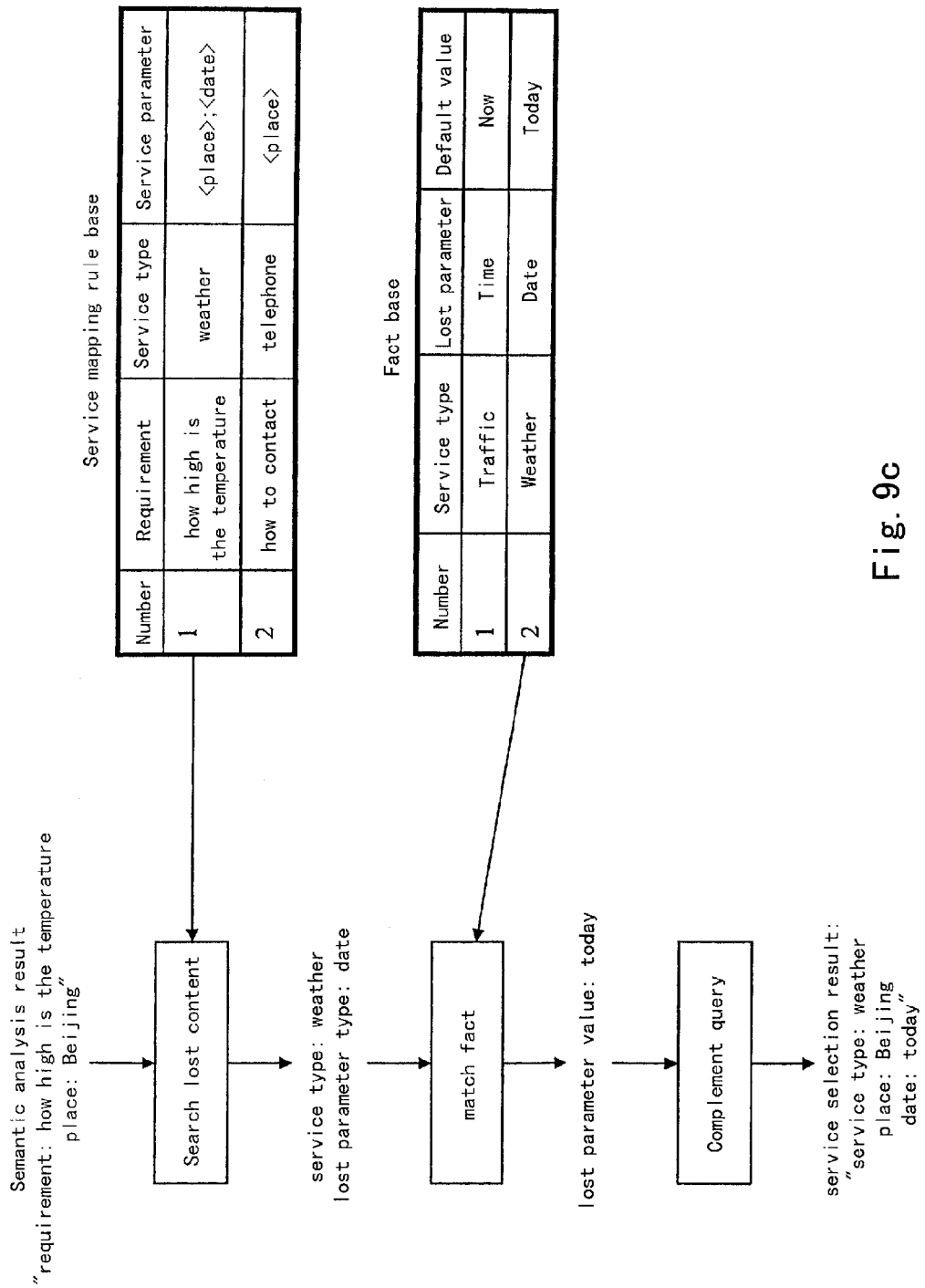
FIG. 9c shows still another example of service selection according to the present invention.

FIG. 9c shows an example of the implementation of service selection, in which the user makes a query of "how high is the temperature in Beijing?", and the semantic analysis result is "requirement: how high is the temperature; place: Beijing".

First step of searching lost content: the first rule in the service mapping rule base has the same requirement "how high is the temperature" as that of the semantic analysis result, and the service parameters "<place>; <date>" contain the parameter "place" of the semantic analysis result, the first rule is therefore taken as a matched rule, with the service type "weather" being extracted and "date" being the parameter lost in the query;

Second step of fact matching: the service type of the second fact is "weather", and the lost parameter is also "date", this fact is thus regarded as the matched fact, and the default value "today" is extracted from the fact;

Final step of complementing the query: adding the service type "weather", the lost parameter "date" and the lost parameter value "today" into the semantic analysis result to obtain a selected service "service type: weather; place: Beijing; date: today".

Figure 10A:
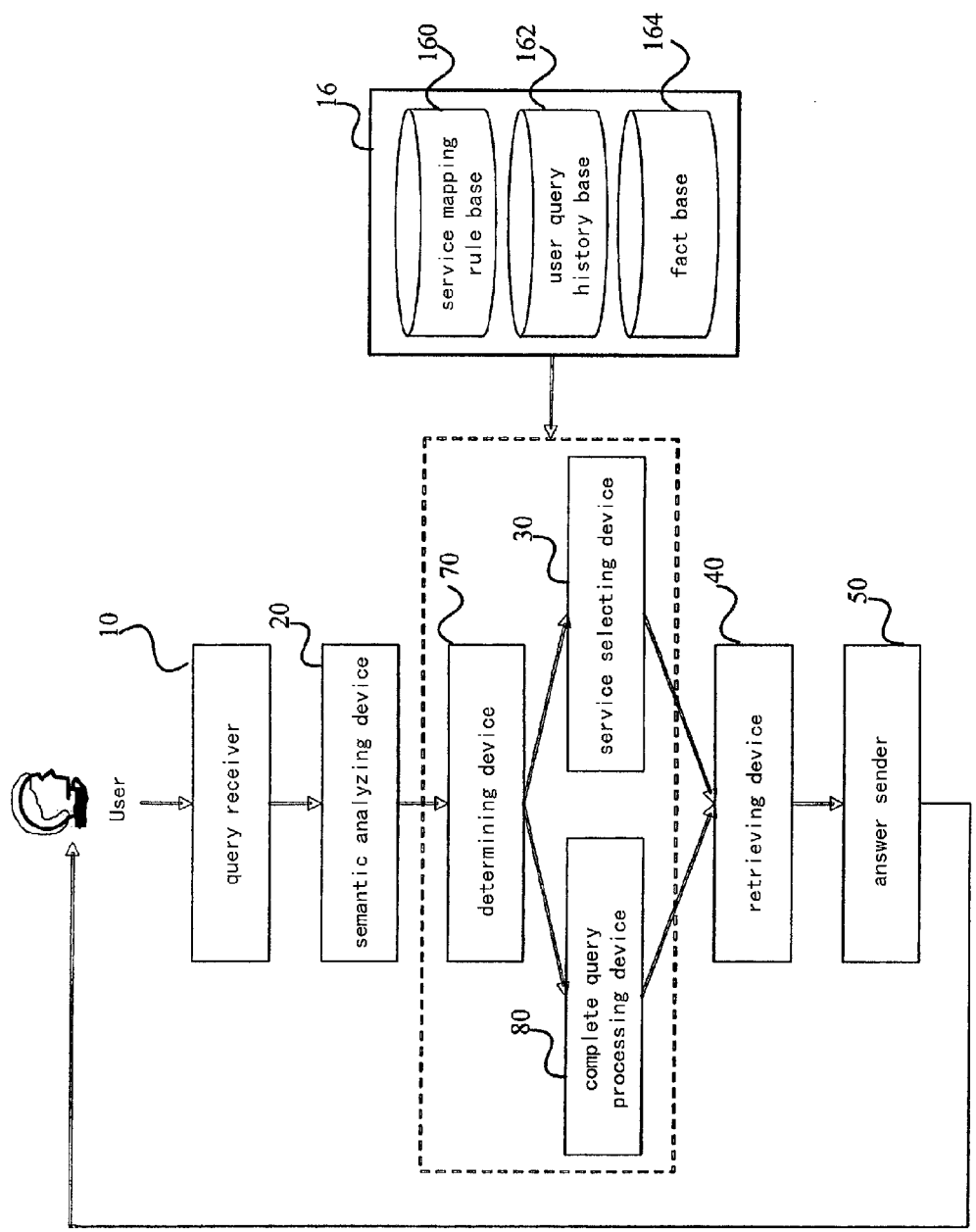
FIG. 10a is a block diagram showing a natural language based service query system according to an embodiment of the present invention.

FIG. 10a shows a natural language based service query system according to an embodiment of the present invention. The difference between FIGS. 10a and 1a is that the natural language based service query system in FIG. 10a further comprises a determining device 70 and a complete query processing device 80. The determining device 70 determines whether a query inputted by a user is complete. The query will be processed by the service selecting device 30 if it is determined as incomplete, otherwise the query will be transferred to the complete query processing device 80.

The determining device 70 determines whether a rule exactly matched with the semantic analysis result of a user query can be found by comparing the semantic analysis result with all service mapping rules, and, if a matched rule is found, then sends the semantic analysis result and the number of the matched rule to the complete query processing device 80; otherwise sends the semantic analysis result to the service selecting device 30. Here, a rule can be regarded as a matched rule if it meets the following conditions:

(1) the rule has the same requirement as that of the semantic analysis result;

(2) all service parameters required by the rule are contained in the semantic analysis result.

Figure 10B:
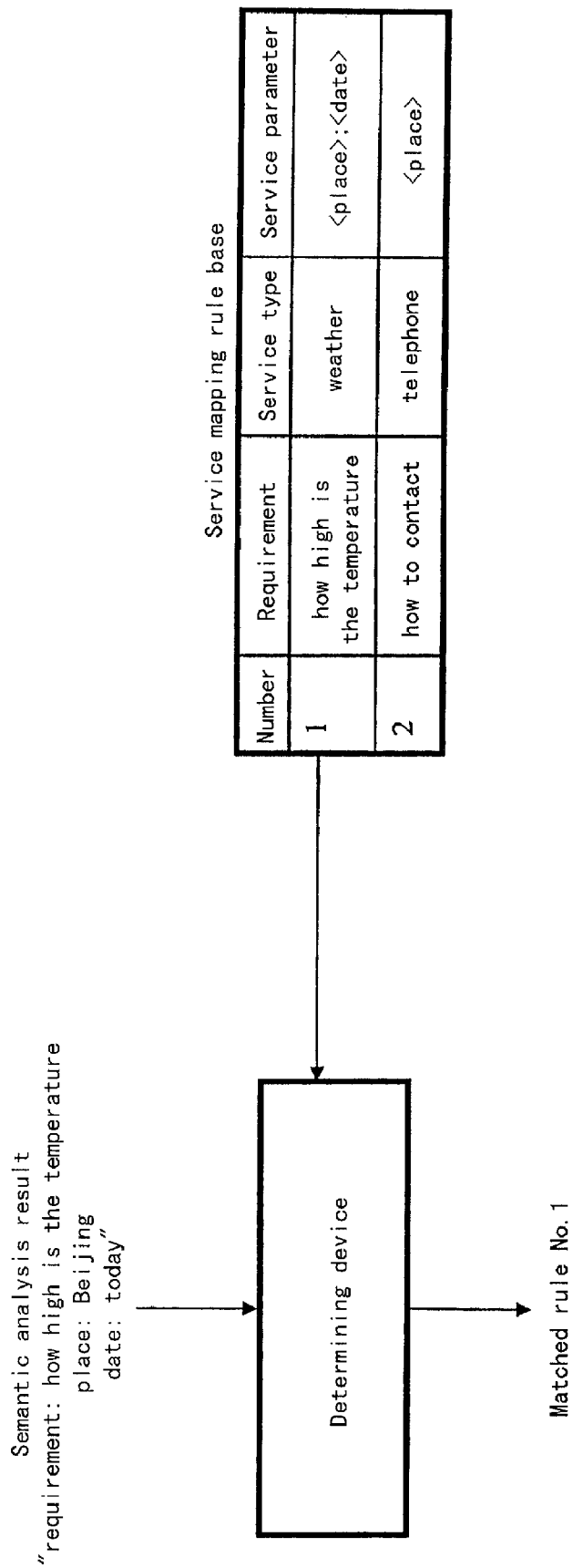
FIG. 10b is a schematic diagram showing how the natural language based service query system performs query process.

As shown in FIG. 10b, the user makes a query of "how high is the temperature in Beijing today?", and the semantic analysis result is "requirement: how high is the temperature; place: Beijing; date: today". This result is exactly matched with the fist rule in the service mapping rule base, since the requirement of the result is the same as that of the rule, and the result contains all the parameters "place" and "date" of the rule. Therefore, the semantic analysis result and the number of the matched rule are sent to the complete query processing device 80 together.

The complete query processing device 80 is adapted to process those complete (without any lost content) queries to acquire the selected service. It finds out a matched rule from the service mapping rule base according to the number of the matched rule obtained by the determining unit, extract the service type and then generate the selected service by combining the semantic analysis result. Here, a selected service usually comprises one service type and a set of service parameters.

Take as an example the user query of "how high is the temperature in Beijing today?", it is exactly matched with the first rule in the service mapping rule base. Thus, the service type "weather" of this rule is extracted and the selected service is generated as "service type: weather; place: Beijing; date: today".

In conclusion, the above service query system can process both an incomplete query and a complete query, and thus find out an answer corresponding to the incomplete or complete query.

Figure 12B:
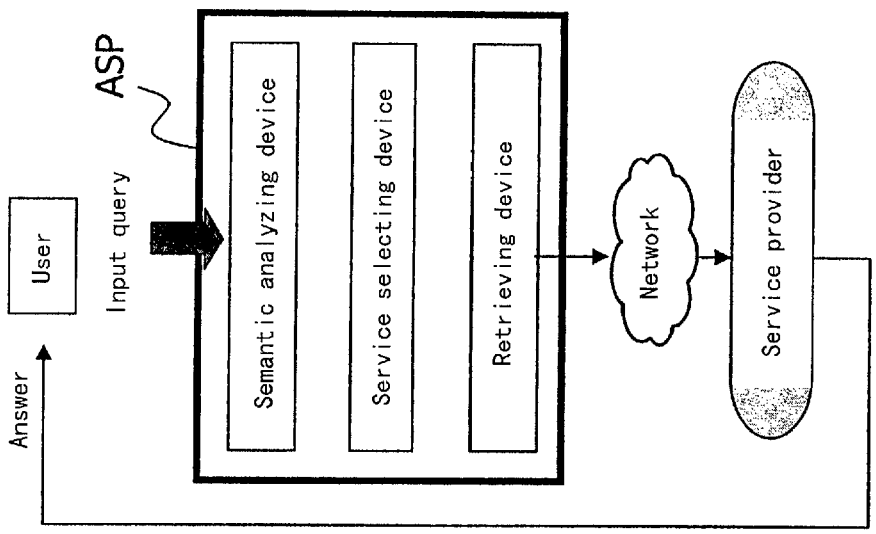
FIGS. 12a and 12b shows a service selecting device used in a mobile terminal and an ASP, respectively.
Figure 12A:
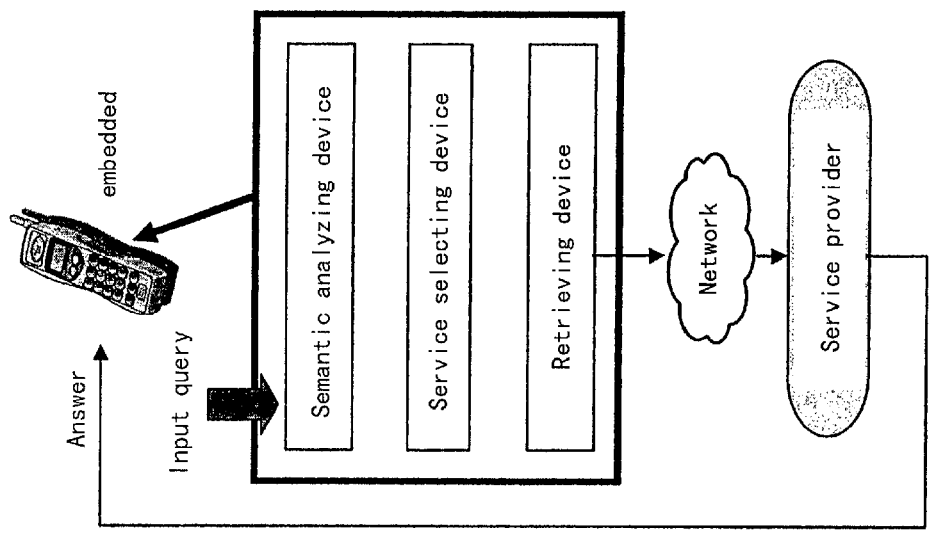

FIGS. 12a and 12b show a schematic diagram for applying the service selecting device according to the present invention to a mobile terminal and an ASP (Active Server Page), respectively. As shown in FIG. 12a, the semantic analyzing device, the service selecting device and the retrieving device can be embedded together into the mobile terminal. Now turning to FIG. 12b, the semantic analyzing device, the service selecting device and the retrieving device can also be embedded into the ASP so that the user can be provided with more convenient and rapid query service.

While the present invention has been described with reference to the above particular embodiments, the present invention should be defined by the appended claims other than these specific embodiments. It is obvious to those ordinarily skilled in the art that any change or modification can be made without departing from the scope and spirit of the present invention.

What is claimed is:

1. A natural language based service selection system for complementing incomplete queries, comprising:
   a semantic analyzing device which analyzes an incomplete query from a user semantically;
   a service selecting device which complements the incomplete query based on a semantically-analyzed query to complete the incomplete query, and selects a corresponding selected service from among a plurality of services based on a complete query;
   a retrieving device which retrieves an answer according to the corresponding selected service; and
   at least one processor coupled to the semantic analyzing device, the service selecting device and the retrieving device,
   wherein the service selecting device comprises a semi-automatic service selecting section which searches lost content in the incomplete query by using a service mapping rule base and complements the lost content through an interacting with the user,
   wherein the semi-automatic service selecting section comprises:
   a lost content searching unit which matches the semantically-analyzed query with a service mapping rule in the service mapping rule base, and extracts a service type to which the incomplete query belongs and a lost parameter in the incomplete query;
   a user interacting unit which prompts the user to input prompt information of a parameter value corresponding to the lost parameter and receives feedback information including the parameter value from the user;
   a parameter value extracting unit which extracts the parameter value from the feedback information of the user; and
   a query complementing unit which adds the service type, the lost parameter and the parameter value into the semantically-analyzed query to form the complete query.

2. The natural language based service selection system according to claim 1, wherein the lost content searching unit retrieves the service mapping rule meeting the following conditions as matched service mapping rule from the service mapping rule base:
   a requirement of the service mapping rule is identical to a requirement of the semantically-analyzed query; and
   a service parameter of the service mapping rule contains a parameter of the semantically-analyzed query.

3. The natural language based service selection system according to claim 1, wherein the parameter value extracting unit retrieves the parameter value corresponding to the lost parameter by semantically marking the feedback information of the user.

4. The natural language based service selection system according to claim 1, wherein the service selecting device comprises:
   an automatic service selecting section which searches lost content in a current query by using the service mapping rule base and complements the lost content through searching a current user query history base or an other user query history base or a fact base to form the complete query; and
   the semi-automatic service selecting section which searches the lost content in the current query by using the service mapping rule base and complements the lost content through interacting with the user to form the complete query, when the corresponding selected service generated by the automatic service selecting section is not accurate.

5. A natural language based service selection system for complementing incomplete queries, comprising:
   a semantic analyzing device which analyzes an incomplete query from a user semantically;
   a service selecting device which complements the incomplete query based on a semantically-analyzed query to complete the incomplete query, and selects a corresponding selected service from among a plurality of services based on a complete query;
   a retrieving device which retrieves an answer according to the corresponding selected service; and
   at least one processor coupled to the semantic analyzing device, the service selecting device and the retrieving device,
   wherein the service selecting device comprises an automatic service selecting section which searches lost content in a current query by using a service mapping rule base and complements the lost content through searching a current user query history base,
   wherein the automatic service selecting section comprises:
   a lost content searching unit which matches the semantically-analyzed query with a service mapping rule in the service mapping rule base, and extracts a service type to which the current query belongs and a lost parameter in the current query;
   a latest query detecting unit which searches a latest query contained the lost parameter in the current query from the current user query history base, and extracts the parameter value corresponding to the lost parameter in the current query; and
   a query complementing unit which adds the service type, the lost parameter and the parameter value into the semantically-analyzed query to form the complete query.

6. The natural language based service selection system according to claim 5, wherein the automatic service selecting section further comprises a similar query detecting unit which searches a history query that contains the lost parameter in the current query as a similar query from the current user query history base when there is no parameter value extracted by the latest query detecting unit, and extracts the parameter value corresponding to the lost parameter in the current query from the similar query.

7. The natural language based service selection system according to claim 6, wherein the similar query detecting unit retrieves the history query meeting the following conditions as a similar query from the current user query history base:

a service type of the history query is identical to a service type to which the current query belongs; and a query parameter of the history query contains a query parameter of the semantically-analyzed query.

8. The natural language based service selection system according to claim 5, wherein the lost content searching unit retrieves the service mapping rule meeting the following conditions as a matched service mapping rule from the service mapping rule base:

a requirement in the service mapping rule is identical to a requirement of the semantically-analyzed query; and a service parameter in the service mapping rule contains a parameter of the semantically-analyzed query.

9. A natural language based service selection system for complementing incomplete queries, comprising:

a semantic analyzing device which analyzes an incomplete query from a user semantically;

a service selecting device which complements the incomplete query based on a semantically-analyzed query to complete the incomplete query, and selects a corresponding selected service from among a plurality of services based on a complete query;

a retrieving device which retrieves an answer according to the corresponding selected service; and at least one processor coupled to the semantic analyzing device, the service selecting device and the retrieving device, wherein the service selecting device comprises an automatic service selecting section which searches lost content in a current query by using a service mapping rule base and complements the lost content through searching an other user query history base, wherein the automatic service selecting section comprises:

a lost content searching unit which matches the semantically-analyzed query with a service mapping rule in the service mapping rule base, and extracts a service type to which the current query belongs and a lost parameter in the current query;

a similar query detecting unit which searches a history query that contains the lost parameter in the current query as a similar query from the other user query history base, and extracts a parameter value corresponding to the lost parameter in the current query from the similar query; and a query complementing unit which adds the service type, the lost parameter and the parameter value into the semantically-analyzed query to form the complete query.

10. The natural language based service selection system according to claim 9, wherein the lost content searching unit retrieves the service mapping rule meeting the following conditions as matched service mapping rule from the service mapping rule base:

a requirement in the service mapping rule is identical to a requirement of the semantically-analyzed query; and a service parameter in the service mapping rule contains a parameter of the semantically-analyzed query.

11. The natural language based service selection system according to claim 9, wherein the similar query detecting unit retrieves the history query meeting the following conditions as a similar query from the other user query history base:

a service type of the history query is identical to the service type to which the current query belongs; and a query parameter of the history query contains a query parameter of the semantically-analyzed query.

12. A natural language based service selection system for complementing incomplete queries, comprising:

a semantic analyzing device which analyzes an incomplete query from a user semantically;

a service selecting device which complements the incomplete query based on a semantically-analyzed query to complete the incomplete query, and selects a corresponding selected service from among a plurality of services based on a complete query;

a retrieving device which retrieves an answer according to the corresponding selected service; and at least one processor coupled to the semantic analyzing device, the service selecting device and the retrieving device, wherein the service selecting device comprises a third an automatic service selecting section which searches lost content in a current query by using a service mapping rule base and complements the lost content through searching a fact base, wherein the automatic service selecting section comprises:

a lost content searching unit which matches the semantically-analyzed query with a service mapping rule in the service mapping rule base, and extracts a service type to which the incomplete query belongs and a lost parameter in the incomplete query;

a fact matching unit which matches the semantically-analyzed query with a fact in a fact base to find a matched fact, and extracts a fault value from the matched fact as a lost parameter value; and a query complementing unit which adds the service type, the lost parameter and the lost parameter value into the semantically-analyzed query to form the complete query.

13. The natural language based service selection system according to claim 12, wherein the lost content searching unit retrieves the service mapping rule meeting the following conditions as a matched service mapping rule from the service mapping rule base:

a requirement in the service mapping rule is identical to a requirement of the semantically-analyzed query; and a service parameter in the service mapping rule contains a parameter of the semantically-analyzed query.

14. The natural language based service selection system according to claim 12, wherein the fact matching unit retrieves the fact meeting the following conditions as matched fact from the fact base:

a service type of the fact is identical to the service type to which the query belongs; and a lost parameter in the fact is identical to the lost parameter in the query.

15. A method of selecting service based on an incomplete query, comprising:

a semantic analyzing step, performed by at least one processor, of analyzing an incomplete query from a user semantically;

a service selecting step, performed by the at least one processor, of complementing the incomplete query based on a semantically-analyzed query to complete the incomplete query, and selecting a corresponding selected service from among a plurality of services based on a complete query; and a retrieving step, performed by the at least one processor, of retrieving an answer according to the corresponding selected service, wherein the service selecting step comprises a semi-automatic service selecting step of searching lost content in the incomplete query by using a service mapping rule base and complementing the lost content through an interacting with the user, wherein the semi-automatic service selecting step comprises:
a lost content searching step of matching the semantically-analyzed query with a service mapping rule in the service mapping rule base, and extracting a service type to which the incomplete query belongs and a lost parameter in the incomplete query;
a user interacting step of prompting the user to input prompt information of a parameter value corresponding to the lost parameter and receiving feedback information including the parameter value from the user;
a parameter value extracting step of extracting the parameter value from the feedback information of the user; and
a query complementing step of adding the service type, the lost parameter and the parameter value into the semantically-analyzed query to form the complete query.

16. The method according to claim 15, wherein the lost content searching step comprises a step of retrieving the service mapping rule meeting the following conditions as matched service mapping rule from the service mapping rule base:
a requirement of the service mapping rule is identical to a requirement of the semantically-analyzed query; and
a service parameter of the service mapping rule contains a parameter of the semantically-analyzed query.

17. The method according to claim 15, wherein the parameter value extracting step retrieves the parameter value corresponding to the lost parameter by semantically marking the feedback information of the user.

18. The method according to claim 15, wherein the service selecting step comprises:
an automatic service selecting step of searching lost content in a current query by using the service mapping rule base and complements the lost content through searching a current user query history base or an other user query history base or a fact base to form the complete query; and
the semi-automatic service selecting step of searching the lost content in the current query by using the service mapping rule base and complementing the lost content through interacting with the user to form the complete query, when the corresponding selected service generated by the automatic service selecting step is not accurate.

19. A method of selecting service based on an incomplete query, comprising:
a semantic analyzing step, performed by at least one processor, of analyzing an incomplete query from a user semantically;
a service selecting step, performed by the at least one processor, of complementing the incomplete query based on a semantically-analyzed query to complete the incomplete query, and selecting a corresponding selected service from among a plurality of services based on a complete query; and
a retrieving step, performed by the at least one processor, of retrieving an answer according to the corresponding selected service,
wherein the service selecting step comprises an automatic service selecting step of searching lost content in a current query by using a service mapping rule base and complementing the lost content through searching a current user query history base,
wherein the automatic service selecting step comprises:
a lost content searching step of matching the semantically-analyzed query with a service mapping rule in the service mapping rule base, and extracting a service type to which the current query belongs and a lost parameter in the current query;
a latest query detecting step of searching a latest query contained the lost parameter in the current query from the current user query history base, and extracting the parameter value corresponding to the lost parameter in the current query; and
a query complementing step of adding the service type, the lost parameter and the parameter value into the semantically-analyzed query to form the complete query.

20. The method according to claim 19, wherein the automatic service selecting step further comprises a similar query detecting step of searching a history query that contains the lost parameter in the current query as a similar query from the current user query history base when there is no parameter value extracted by the latest query detecting step, and extracting the parameter value corresponding to the lost parameter in the current query from the similar query.

21. The method according to claim 20, wherein the similar query detecting step comprises a step of retrieving the history query meeting the following conditions as a similar query from the current user query history base:
a service type of the history query is identical to a service type to which the current query belongs; and
a query parameter of the history query contains a query parameter of the semantically-analyzed query.

22. The method according to claim 19, wherein the lost content searching step comprises a step of retrieving the service mapping rule meeting the following conditions as a matched service mapping rule from the service mapping rule base:
a requirement in the service mapping rule is identical to a requirement of the semantically-analyzed query; and
a service parameter in the service mapping rule contains a parameter semantically-analyzed query.

23. A method of selecting service based on an incomplete query, comprising:
a semantic analyzing step, performed by at least one processor, of analyzing an incomplete query from a user semantically;
a service selecting step, performed by the at least one processor, of complementing the incomplete query based on a semantically-analyzed query to complete the incomplete query, and selecting a corresponding selected service from among a plurality of services based on a complete query; and
a retrieving step, performed by the at least one processor, of retrieving an answer according to the corresponding selected service,
wherein the service selecting step comprises an automatic service selecting step of searching lost content in a current query by using a service mapping rule base and complementing the lost content through searching an other user query history base,
wherein the automatic service selecting step comprises:
a lost content searching step of matching the semantically-analyzed query with a service mapping rule in the service mapping rule base, and extracting a service type to which current query belongs and a lost parameter in the current query;
a similar query detecting step of searching a history query that contains the lost parameter in the current query as a similar query from the other user query history base, and extracting a parameter value corresponding to the lost parameter in the current query from the similar query; and a query complementing step of adding the service type, the lost parameter and the parameter value into the semantically-analyzed query to form the complete query.

24. The method according to claim 23, wherein the lost content searching step comprises a step of retrieving the service mapping rule meeting the following conditions as matched service mapping rule from the service mapping rule base:
   a requirement in the service mapping rule is identical to a requirement of the semantically-analyzed query; and
   a service parameter in the service mapping rule contains a parameter of the semantically-analyzed query.

25. The method according to claim 23, wherein the similar query detecting step comprises a step of retrieving the history query meeting the following conditions as a similar query from the other user query history base:
   a service type of the history query is identical to the service type to which the current query belongs; and
   a query parameter of the history query contains a query parameter of the semantically-analyzed query.

26. A method of selecting service based on an incomplete query, comprising:
   a semantic analyzing step, performed by at least one processor, of analyzing an incomplete query from a user semantically;
   a service selecting step, performed by the at least one processor, of complementing the incomplete query based on a semantically-analyzed query to complete the incomplete query, and selecting a corresponding selected service from among a plurality of services based on a complete query; and
   a retrieving step, performed by the at least one processor, of retrieving an answer according to the corresponding selected service,
   wherein the service selecting step comprises an automatic service selecting step of searching lost content in a current query by using a service mapping rule base and complementing the lost content through searching a fact base,
   wherein the automatic service selecting step comprises:
   a lost content searching step of matching the semantically-analyzed query with a service mapping rule in the service mapping rule base, and extracting a service type to which the incomplete query belongs and a lost parameter in the incomplete query;
   a fact matching step of matching the semantically-analyzed query with a fact in a fact base to find a matched fact, and extracting a fault value from the matched fact as a lost parameter value; and
   a query complementing step of adding the service type, the lost parameter and the lost parameter value into the semantically-analyzed query to form the complete query.

27. The method according to claim 26, wherein the lost content searching step of retrieving the service mapping rule meeting the following conditions as a matched service mapping rule from the service mapping rule base:
   a requirement in the service mapping rule is identical to a requirement of the semantically-analyzed query; and
   a service parameter in the service mapping rule contains a parameter of the semantically-analyzed query.

28. The method according to claim 26, wherein the fact matching step of retrieving the fact meeting the following conditions as matched fact from the fact base:
   a service type of the fact is identical to the service type to which the current query belongs; and
   a lost parameter in the fact is identical to the lost parameter in the current query.

29. A query system, comprising:
   a query receiver which receives a user query;
   a semantic analyzing device which parses the user query and semantically analyzes the user query;
   a service selecting device which complements an incomplete query based on the semantically-analyzed query to form the complete query, and selects a corresponding selected service from among a plurality of services based on a complete query;
   a retrieving device which retrieves an answer according to the corresponding selected service;
   an answer sender which sends the answer to a user; and
   at least one processor coupled to the query receiver, the semantic analyzing device, the service selecting device, the retrieving device and the answer sender,
   wherein the service selecting device comprises a semi-automatic service selecting section which searches lost content in the incomplete query by using a service mapping rule base and complements the lost content through an interacting with the user,
   wherein the semi-automatic service selecting section comprises:
   a lost content searching unit which matches the semantically-analyzed query with a service mapping rule in the service mapping rule base, and extracts a service type to which the incomplete query belongs and a lost parameter in the incomplete query;
   a user interacting unit which prompts the user to input prompt information of a parameter value corresponding to the lost parameter and receives feedback information including the parameter value from the user;
   a parameter value extracting unit which extracts the parameter value from the feedback information of the user; and
   a query complementing unit which adds the service type, the lost parameter and the parameter value into the semantically-analyzed query to form the complete query.

30. A query method, comprising:
   a query receiving step, performed by at least one processor, of receiving a user query;
   a semantic analyzing step of parsing the user query and semantically analyzes the user query;
   a service selecting step, performed by the at least one processor, of complementing an incomplete query based on the semantically-analyzed query to complete the incomplete query, and selecting a corresponding selected service from among a plurality of services based on a complete query;
   a retrieving step, performed by the at least one processor, of retrieving an answer according to the corresponding selected service; and
   an answer sending step, performed by the at least one processor, of sending the answer to a user,
   wherein the service selecting step comprises a semi-automatic service selecting step of searching lost content in the incomplete query by using a service mapping rule base and complementing the lost content through an interacting with the user,
   wherein the semi-automatic service selecting step comprises:
   a lost content searching step of matching the semantically-analyzed query with a service mapping rule in the service mapping rule base, and extracting a service type to which the incomplete query belongs and a lost parameter in the incomplete query;

a user interacting step of prompting the user to input prompt information of a parameter value corresponding to the lost parameter and receiving feedback information including the parameter value from the user;

a parameter value extracting step of extracting the parameter value from the feedback information of the user; and a query complementing step of adding the service type, the lost parameter and the parameter value into the semantically-analyzed query to form the complete query.

31. A query system, comprising:

a query receiver which receives a user query;

a semantic analyzing device which parses the user query and semantically analyzes the user query;

a determining device which determines whether the user query is a complete user query;

a first service selecting device which performs a process on the complete user query and selects a first selected service from among a plurality of services based on the complete user query;

a second service selecting device which complements an incomplete user query to complete the incomplete user query and selects a second selected service from among the plurality of services based on the completed incomplete user query;

a retrieving device which retrieves an answer according to the first selected service or the second selected service;

an answer sender which sends the answer to a user; and at least one processor coupled to the query receiver, the semantic analyzing device, the determining device, the first service selecting device, the second service selecting device, the retrieving device and the answer sender, wherein the second service selecting device comprises a semi-automatic service selecting section which searches lost content in the incomplete query by using a service mapping rule base and complements the lost content through an interacting with the user, wherein the semi-automatic service selecting section comprises:

a lost content searching unit which matches the semantically-analyzed query with a service mapping rule in the service mapping rule base, and extracts a service type to which the incomplete query belongs and a lost parameter in the incomplete query;

a user interacting unit which prompts the user to input prompt information of a parameter value corresponding to the lost parameter and receives feedback information including the parameter value from the user;

a parameter value extracting unit which extracts the parameter value from the feedback information of the user; and a query complementing unit which adds the service type, the lost parameter and the parameter value into the semantically-analyzed query to form the complete query.

32. The query system according to claim 31, wherein the determining device matches the semantically-analyzed user query with the service mapping rule in the service mapping rule base, if a matching is successful, the user query is sent to the first service selecting device; and if the matching is not successful, the user query is sent to the second service selecting device.

33. The query system according to claim 32, wherein the determining device determines whether the matching is successful according to the following conditions:

a requirement of the service mapping rule is identical to a requirement of the semantically-analyzed query; and a service parameter of the service mapping rule contains a parameter of the semantically-analyzed query.

34. A query method, comprising:

a query receiving step, performed by at least one processor, of receiving a user query;

a semantic analyzing step, performed by the at least one processor, of parsing the user query and semantically analyzes the user query;

a determining step, performed by the at least one processor, of determining whether the user query is a complete user query;

a first service selecting step, performed by the at least one processor, of performing a process on the complete user query and selecting a first selected service from among a plurality of services based on the complete user query;

a second service selecting step, performed by the at least one processor, of complementing an incomplete query to complete the incomplete user query and selecting a second selected service from among the plurality of services based on the completed incomplete user query;

a retrieving step, performed by the at least one processor, of retrieving an answer according to the first selected service or the second selected service; and an answer sending step, performed by the at least one processor, of sending the answer to a user, wherein the second service selecting step comprises a semi-automatic service selecting step of searching lost content in the incomplete query by using a service mapping rule base and complementing the lost content through an interacting with the user, wherein the semi-automatic service selecting step comprises:

a lost content searching step of matching the semantically-analyzed query with a service mapping rule in the service mapping rule base, and extracting a service type to which the incomplete query belongs and a lost parameter in the incomplete query;

a user interacting step of prompting the user to input prompt information of a parameter value corresponding to the lost parameter and receiving feedback information including the parameter value from the user;

a parameter value extracting step of extracting the parameter value from the feedback information of the user; and a query complementing step of adding the service type, the lost parameter and the parameter value into the semantically-analyzed query to form the complete query.

35. The query method according to claim 34, wherein the determining step comprises a step of matching the semantically-analyzed user query with the service mapping rule in the service mapping rule base, if the matching is successful, the user query is processed by the first service selecting step; and if the matching is not successful, the user query is processed by the second service selecting step.

36. The query method according to claim 35, wherein the determining step determines whether the matching is successful according to the following conditions:

a requirement of the service mapping rule is identical to a requirement of the semantically-analyzed query; and a service parameter of the service mapping rule contains a parameter of the semantically-analyzed query.

* * * * *